(12) United States Patent
Sieffert et al.

(10) Patent No.: US 8,150,757 B1
(45) Date of Patent: Apr. 3, 2012

(54) WEB-BASED INFOMEDIARY FOR INTELLECTUAL PROPERTY TRANSFER

(75) Inventors: Kent J. Sieffert, Woodbury, MN (US); Steven W. Lundberg, Edina, MN (US)

(73) Assignee: FoundationIP, LLC, Minneapolis, MN (US)

(*) Notice: Subject to any disclaimer, the term of this patent is extended or adjusted under 35 U.S.C. 154(b) by 0 days.

(21) Appl. No.: 09/346,063

(22) Filed: Jul. 1, 1999

(51) Int. Cl.
*G06Q 30/00* (2006.01)

(52) U.S. Cl. ........... 705/37; 705/26; 705/27; 705/35; 705/36; 705/38; 705/80

(58) Field of Classification Search ........... 705/26, 705/27, 37, 36, 35, 38, 80, 78
See application file for complete search history.

(56) References Cited

U.S. PATENT DOCUMENTS

| | | | | |
|---|---|---|---|---|
| 5,794,207 | A * | 8/1998 | Walker et al. | 705/26 |
| 5,835,896 | A * | 11/1998 | Fisher et al. | 705/37 |
| 7,287,007 | B1 * | 10/2007 | Detering | 705/37 |
| 2002/0002523 | A1 * | 1/2002 | Kossovsky et al. | 705/36 |
| 2002/0002524 | A1 * | 1/2002 | Kossovsky et al. | 705/36 |
| 2002/0004775 | A1 * | 1/2002 | Kossovsky et al. | 705/37 |

OTHER PUBLICATIONS http://www.eurekalert.org/pub_releases/1999-01/FI-PART-220199.php, "PLX Announces Plans to Revolutionize $3.5 Billion Patent Industry Through Global, Internet-Based Patent Auction Market.", Jan. 22, 1999.*

The Patent & License Exchange, Inc., House Rules, Copyright 1999.*

"Electronic Design; An Internet Exchange Aims to Revolutionize Trading in Intellectual Property Patents", Penton Media, Inc, Mar. 22, 1999.*

The Recorder, "Law Inc., Business and Technology; Are Patents Next for the Online Auction Block?", May 20, 1999.*

Kossovsky, U.S. Appl. No. 60/124,847.*

Kossowsky, U.S. Appl. No. 60/124,847, Appendix.*

* cited by examiner

*Primary Examiner* — Nga B. Nguyen
(74) *Attorney, Agent, or Firm* — Computer Patent Annuities North America, LLC

(57) ABSTRACT

A system and method provide a web-based infomediary for dissemination of intellectual property transfer information among multiple users via a global computer network such as the World Wide Web. The system and method can be used to provide network users with information to facilitate transfer of intellectual property rights by assignment or license. Also, the system and method can be configured to collect bids and offers from parties seeking to acquire rights, or conduct a web-based auction. In this manner, the system and method provide a web-based infomediary in the sense that they facilitate person-to-person or business-to-business online exchanges that leverage the Internet to unite buyers and sellers into a single, efficient virtual marketplace that provides a concentration of pertinent information.

22 Claims, 19 Drawing Sheets

IP EXCHANGE

SELECT A CATEGORY:
→ *PATENT
*TRADEMARK
*COPYRIGHT
*TRADE SECRET/KNOW-HOW
*MASK WORK
*DOMAIN NAMES
*TELEPHONE NUMBERS
*OTHER

*FIG. 3*

IP EXCHANGE

PATENT

SELECT A TECHNOLOGY OR INDUSTRY:

TECHNOLOGY:

*ELECTRICAL & COMPUTER
*CHEMICAL
*BIO TECH
*MECHANICAL

INDUSTRY:

*INTERNET
*SOFTWARE
→ *DATA STORAGE
*SEMICONDUCTOR
*IMAGING
*MEDICAL DEVICES
*BIOPHARM
*
*
*

*FIG. 4*

```
                    IP EXCHANGE
              PATENT-INDUSTRY-DATA STORAGE

1. *ABC CORP., *MAGNETO-OPTIC RECORDING MEDIUM
    2. *ABC CORP., *PICKER MECHANISM FOR TAPE LIBRARY
 →  3. *XYZ CORP., *MAGNETIC TAPE CARTRIDGE
    4. *ACME CORP., *MAGNETIC RECORDING HEAD
    5. *AJAX CORP., *NEAR FIELD OPTICAL RECORDING HEAD
    6. *XYZ CORP., *ANTI-COUNTERFEIT DEVICE FOR OPTICAL DISC
       *
       *
       *
       *
```

*FIG. 5*

```
                    IP EXCHANGE
              PATENT-INDUSTRY-DATA STORAGE

XYZ CORP., MAGNETIC TAPE CARTRIDGE

*UNITED STATES PATENT NO. 6,000,000
 PROPOSED TRANSACTION: ASSIGNMENT OF LICENSE GRANTED TO ABC INC.
 ABSTRACT: A MAGNETIC TAPE CARTRIDGE HAVING ...
 INVENTOR(S): JUDY JONES
 BID PERIOD: DEC. 2 TO DEC. 10, 1999
 MINIMUM BID: $500,000

*LICENSE AGREEMENT              *PROSECUTION HISTORY
 *ROYALTY REPORTS                *XYZ HOME PAGE
 *PRIOR ART                      *ABC HOME PAGE
 *RELATED PATENTS                *TRANSFER TERMS
 *REQUEST MORE INFO              *ENTER BIDDING
```

*FIG. 6*

IP EXCHANGE
PATENT-INDUSTRY-DATA STORAGE
BIDDING IN PROGRESS

XYZ CORP., MAGNETIC TAPE CARTRIDGE
*USPN 6,000,000
PROPOSED TRANSACTION: ASSIGNMENT OF LICENSE GRANTED TO ABC INC.
ABSTRACT: A MAGNETIC TAPE CARTRIDGE HAVING . ..
INVENTOR(S): JUDY JONES
BID PERIOD: DEC. 2 TO DEC. 10, 1999
MINIMUM BID: $500,000

*LICENSE AGREEMENT
*ROYALTY REPORTS
*PRIOR ART
*RELATED PATENTS         CURRENT BID:   $675,000
*REQUEST MORE INFO
*PROSECUTION HISTORY     YOUR BID:      $750,000
*XYZ HOME PAGE
*ABC HOME PAGE           X-LICENSE    SUBMIT
*TRANSFER TERMS

*FIG. 7*

IP EXCHANGE
BIDDING IN PROGRESS

XYZ CORP., MAGNETIC TAPE CARTRIDGE

BID HISTORY:     *ABC CORP.     $500,000
                 *QRS CORP.     $550,000
                 *ABC CORP.     $625,000
                 *JONES INC.    $650,000
                 *ABC CORP.     $675,000

CURRENT HIGH BID      :$675,000

*FIG. 8*

```
            IP EXCHANGE
      PATENT-INDUSTRY-DATA STORAGE
         CROSS-LICENSING OFFER

FOR: XYZ CORP., *MAGNETIC TAPE CARTRIDGE
FROM: *JONES INC.
PROPOSED CROSS-LICENSE:
    *NONEXCLUSIVE LICENSE
     USPN *6,000,001 AND *6,000,002
    *PRIOR ART
    *RELATED PATENTS
    *PROSECUTION HISTORY
    *JONES HOME PAGE
    *REQUEST MORE INFO
```

*FIG. 9*

```
                    IP EXCHANGE
            PATENT-INDUSTRY-DATA STORAGE
ABCCORP., MAGNETO-OPTIC RECORDING MEDIUM - TRANSFER TERMS
*UNITED STATES PATENT NO. 6,000,005        *OTHER INFORMATION
PROPOSED TRANSACTION: NONEXCLUSIVE LICENSE
BID PERIOD: DEC. 2 TO DEC. 10, 1999
MINIMUM BID: $250,000 UP-FRONT + 4%

TRANSFER TERMS:
SCOPE: NONEXCLUSIVE              TERM: THROUGH EXPIRATION
FIELDS: OPEN                     UP-FRONT: $250,000
ROYALTY RATE: 4%                 TECH SUPPORT: NO
ROYALTY BASE: NET SALES OF DUAL-LAYER MAGNETO-OPTIC DISCS
              INFRINGING ANY CLAIM OF THE LICENSED PATENT
OTHER TERMS: STANDARD
```

*FIG. 10*

```
            IP EXCHANGE
     PATENT-INDUSTRY-DATA STORAGE
ABCCORP., MAGNETO-OPTIC RECORDING MEDIUM - TRANSFER TERMS
*UNITED STATES PATENT NO. 6,000,005      *INFORMATION
TRANSFER TERMS:

SCOPE:  ○ NONEXCLUSIVE  ○ EXCLUSIVE  ○ SOLE   ○ SUB

TERM:   ○ 5 YEARS       ○ 10 YEARS   ○ EXPIRATION

FIELDS: ○ OPEN  ○ OTHER   TECH SUPPORT ○ YES   ○ NO

UP- FRONT: [$        ]    ROYALTY RATE: [      %]

ROYALTY BASE: [                                    ]
OTHER TERMS:  ○ STANDARD   ○ SPECIFY  [SUBMIT] [CLEAR]
```

*FIG. 11*

```
               IP EXCHANGE
    TRANSFER ITEMS - ABC CORP. - PACKAGING

⬛ ABC CORP., *MAGNETO-OPTIC RECORDING MEDIUM - PATENT - LICENSE
⬛ ABC CORP., *"MOR" - TRADEMARK - ASSIGNMENT
○ ABC CORP., *"ABC INSIDE" - TRADEMARK - LICENSE
⬛ ABC CORP., *VAPOR DEPOSITION PROCESS - KNOW- HOW - LICENSE
○ ABC CORP., *WEB COATING PROCESS - PATENT - LICENSE
○ ABC CORP., *MSDS TRACKER SOFTWARE - COPYRIGHT/KNOW-HOW -
              LICENSE
○ ABC CORP., *MAGNETIC RECORDING HEAD - PATENT - LICENSE
```

*FIG. 12*

IP EXCHANGE
ABC ITEMS

- ⊘ *ABC CORP., *MAGNETO-OPTIC RECORDING MEDIUM - PATENT - LICENSE
- ⊘ *ABC CORP., *"MOR" - TRADEMARK - ASSIGNMENT
- ○ *ABC CORP., *VAPOR DEPOSITION PROCESS - KNOW- HOW - LICENSE

XYZ ITEMS

- ⊘ *XYZ INC., *MO MEDIA CARTRIDGE - PATENT - LICENSE
- ⊘ *XYZ INC., *MO HEAD ASSEMBLY - PATENT - LICENSE
- ○ *XYZ INC., *MAGNETIC TAPE CARTRIDGE - PATENT - LICENSE

*FIG. 13*

IP EXCHANGE
PATENT "BLIND"

ENTER TARGET ASSET:

PATENT NO(S).:  [           ]

COUNTRY(IES).:  [           ]

ASSIGNEE (IF KNOWN).:  [           ]

*TERMS

DISCLOSE IDENTITY?   [ NO ]   [ YES ]

*FIG. 14*

WEB-BASED INFOMEDIARY FOR INTELLECTUAL PROPERTY TRANSFER

TECHNICAL FIELD

The present invention relates to intellectual property transfer and, more particularly, to transfer of intellectual property rights via a web-based infomediary.

BACKGROUND

Intellectual property is a highly valuable asset for many companies, particularly in technology-related industries. Intellectual property rights protect a company's investment in its products, ideas, name, and reputation, and help maintain competitive advantage. Intellectual property can be developed internally or acquired from third parties. For example, a company may secure intellectual property rights in technology developed by its employees, or obtain access to technology developed by third parties through the purchase or license of intellectual property rights. At the same, a company may seek to generate added revenue by selling or licensing its intellectual property rights to third parties. In each case, the purchaser or licensee seeks to enhance its competitive advantages, whereas the seller or licensor seeks to increase revenue.

Transfer to a third party can be especially attractive when a company has not commercialized a particular technology and the applicable intellectual property rights provide little blocking protection. Finding a purchaser or licensee can be difficult, however, and often requires extensive research. Once a potential purchaser or licensee is finally identified, the process for negotiating the transfer terms can be protracted. Moreover, the time and resources necessary to both identify an opportunity and close the deal can cut into ultimate revenues. Legal services, in particular, represent a substantial cost that can substantially impact the bottom line. Also, a licensing consultant often demands a percentage of revenues in consideration of efforts in finding a purchaser or licensee.

A company seeking to acquire intellectual property rights faces similar problems. The uncertain cost of transfer, in particular, may create a barrier to discussions. Often, calculation of the appropriate amount is speculative. In addition, it can be difficult to determine whether the intellectual property owner has any interest in selling its rights or granting licenses. A company also may be hesitant to approach an intellectual property owner when infringement is a concern. In particular, the company may not want to "tip off" the owner of the intellectual property rights, and thereby invite an infringement suit. Once an opportunity is identified, the company seeking rights must engage in due diligence analysis for valuation. In the end, infringement concerns, uncertainties, and expenditures of both time and resources can prevent a transfer that could be beneficial to both parties.

The market for intellectual property rights also includes a small, but growing group of intellectual property investors. Intellectual property investors seek out new technologies and applicable intellectual property rights, either for product commercialization or exploitation by sale, licensing, or litigation. Intellectual property investors do not typically have infringement concerns, but are subject to some of the same problems faced by intellectual property owners and companies seeking transfer. Specifically, investors must expend substantial time and resources in the identification of opportunities. Without knowledge of an owner's posture for or against transfer, for example, the investor can pursue many leads that result in dead ends. Once the owner expresses an interest, it may be difficult to establish a market value for the intellectual property rights. Again, extensive due diligence analysis usually is necessary.

With the many barriers described above, companies can easily miss opportunities to maximize revenue or enhance competitive advantage through intellectual property transfer. Intellectual property rights often are left to languish and expire while the technology goes uncommercialized. Usually, the root cause is a lack of information.

SUMMARY

The present invention is directed to a system and method for dissemination of intellectual property transfer information among multiple users via a global computer network such as the World Wide Web. The system and method can be used to provide network users with information to facilitate transfer of intellectual property rights by assignment or license. Also, the system and method can be configured to collect offers from parties seeking to acquire rights, or conduct a web-based auction. In this manner, the system and method provide a web-based infomediary in the sense that they facilitate person-to-person or business-to-business online exchanges that leverage the Internet to unite buyers and sellers into a single, efficient virtual marketplace that provides a concentration of pertinent information.

The infomediary can be implemented via software executing on computers connected to the global computer network, and preferably takes the form of a web site on the network. In particular, multiple users may access a web site to view the intellectual property transfer information and provide interactive input using web browser applications. One or more web servers generate web pages for presentation of information requested by users, and provide input media for collection of information from users.

The intellectual property rights transferred via the infomediary may include interests in patents, trademarks, copyrights, trade secrets, know-how, and mask works, including issued rights, registrations, and applications, as well as web domain names, and telephone numbers. The interests may take the form of assignments or licenses. Also, the transferred intellectual property rights may include interests in license agreements that can be assigned or sublicensed, in whole or in part, as well as options to acquire interests in rights or licenses. In particular, the rights subject to transfer may include rights to an existing or future royalty stream associated with a license agreement, or at least an option to acquire the interest in the future should the subject technology or products be commercially successful. A licensor may seek to assign a license agreement with prospective licensing revenue in exchange for discounted, present compensation. In this manner, the infomediary may facilitate a marketplace for assignment of royalty revenue.

The posting of intellectual property transfer information on a network resource residing on a global computer network can provide significant value to companies or firms seeking to transfer or acquire intellectual property rights. Posting of intellectual property rights for transfer communicates the owner's willingness to dispose of the rights. The terms for transfer can be posted with a description of the intellectual property rights. The terms may include various licensing terms, and a starting offer price or minimum opening bid. Bids submitted at auction help establish a market price for the intellectual property rights. The transfer terms, including price information, can be readily accessed, eliminating much speculation and uncertainty on the part of the party seeking rights.

The transfer terms can be selected by the intellectual property owner, for example, by selecting one of several form agreements provided on-line by a web site administrator. As an alternative, the intellectual property owner may upload a desired transfer agreement for posting with the information describing the intellectual property rights. Further, the system and method may permit the owner to select a number of different terms, for example, using a check-box, pull-down menu, or radio button format presented on a web page generated by the web server. In this manner, the user can produce a customized set of terms, or at least modify terms set forth in the form agreements In any event, the potential purchasers or bidders are able to view the terms prior to submitting a bid, and thereby assess the value of the proposed transfer relative to cost.

The terms may efficiently set all of the substantive provisions of the transfer, such as scope, consideration, duration, indemnification, continuing prosecution, and warranties, leaving no opportunity for negotiation. Alternatively, the terms may address only key issues and contemplate further negotiation once the parties agree on price and scope. For efficiency, it may be desirable that the terms be comprehensive, and that further negotiation be conducted only in rare cases. In an auction format, in particular, bids are submitted in contemplation of a fixed set of terms. Accordingly, negotiation may be less prevalent in when rights are auctioned. If negotiation is necessary, the parties may communicate via the web site or using more conventional modes such as email, facsimile, telephone, and personal communications.

The terms of the transfer will ordinarily specify an up-front cash payment, royalties, or a combination of both. In some cases, however, the owner may entertain offers for cross-license of third party rights. In exchange for a license under rights owned by one party, for example, another party may offer a license under rights that it owns. Cross-licensing is prevalent in many industries, of course, as a means to avoid potential blocking situations, settle litigation, or open new opportunities. The infomediary can provide an efficient and mechanism for identifying cross-licensing opportunities.

To facilitate evaluation and due diligence, the information posted for a proposed transfer can be quite extensive. For a patent, for example, the information may include electronic copies of the pertinent patent, prosecution history, litigation history, and family history, as well as pertinent prior art references and web sites associated with the patent assignee, and links to related patents, e.g., sharing common filing date priority. Advantageously, in many cases, this information can be gathered from public domain databases distributed across the global computer network. Copies of patents, for example, can be gathered from public domain resources associated with patent offices around the world. The U.S. Patent and Trademark Office web site (www.uspto.gov), for example, provides both text and images of issued U.S. patents. The information posted by the web server may incorporate such text and imagery or, more preferably, provide hypertext links to them. Also, the information may include links to documents, such as uploaded agreements, that are stored on a file server accessed by the web server.

Intellectual property owners can submit particular rights as items for sale, exchange or auction via a web browser interface. In particular, when the user selects a hypertext link for submission of a transfer item, the web server may kick off one or more web pages that prompt the user for appropriate information, including the identity of the owner and the intellectual property right, and links to other supplemental information. The web pages also may direct the owner through a process for selection of terms. Alternatively, the owner may be equipped with a local asset control center that tracks and maintains intellectual property assets. The asset control center can be configured to upload a group of items on an automated basis upon selection by a user. In either case, the web server interacts with a database server and file server to create database records and archive files relating to each item. When a potential purchaser requests access to an item for evaluation, the web server retrieves the appropriate information and presents it in HTML format.

It may be desirable, for example, to "package" or "pool" separate intellectual property rights for transfer. In this manner, a number of related intellectual property rights, perhaps representing a particular technology portfolio, can be combined for placement with a single entity. Packaging may add scope or term to the item being offered, or offer synergies between the rights, increasing the value of the transfer item and the size of offers or bids. The matters could be combined, on the basis of similarity of technology or product line. Also, a company could package all of the intellectual property rights for a particular business, or package a number or related license agreements to increase overall package value based on cumulative royalty streams.

Alternatively, a number of generally unrelated rights can be packaged simply on the basis of convenience. Indeed, if negotiation of terms is necessary, dealing with a single entity, instead of several, can provide the owner with administrative advantages whether subject matter is similar or not. Packaging also can simplify the offer or bidding process, reducing the number of different matters up for bid. Further, packaging can promote the participation of larger companies. Instead of making offers or bidding on several individual matters, a company may see more value in a portfolio of intellectual property rights or agreements.

In addition to packaging its own intellectual property rights, an owner may seek out other owners and attempt to pool its rights with those of one or more additional owners. In other words, two or more owners may choose to pool their intellectual property rights for the offer or bidding process, again increasing the volume of technology. Ordinarily, pooling by different parties will involve related intellectual property rights, e.g., patent rights for related technology, that provide synergy or greater scope of coverage. Two different universities, for example, may decide to pool intellectual property rights with respect to similar technologies and increase the value of the overall transfer item. Often, with intellectual property, the whole can be much greater than the sum of the parts, particularly where blocking rights are implicated.

The offer or bidding process also may have a collective aspect in terms of the parties seeking to acquired rights. In particular, parties seeking transfer of intellectual property rights may have the capability to pool their offers or bids. When a larger or higher value package of intellectual property rights is posted for bidding, smaller companies may have insufficient resources to purchase or license them. To promote access to larger or more costly portfolios, smaller companies may pool their bids and then divide the resulting rights among themselves. Of course, the companies will be cognizant of the resulting reduction in individual value when the rights are divided.

When the companies desire to manufacture different components of an overall product, however, access to applicable intellectual property rights can be mutually beneficial. In this manner, smaller or more narrowly focused companies can compete with larger, more diversified companies without compromising their growth plans or stretching themselves too far. The firms that pool their offers or bids may have preexisting relationships, and may identify themselves as a bidding collective for purposes of the offer or bidding process. Alternatively, pooling may take place on an ad-hoc basis, and be facilitated by communication between the companies.

If the firms are registered as a bidding collective, one of the firms may be designated to enter bids for the entire collective. Alternatively, firms may submit individual bids that are then summed to produce a total bid on behalf of the collective. For example, two firms may enter and increase bids individually during the course of an auction, but request that they be combined upon receipt. The total bid is compared to bids submitted by other collectives or individuals.

In any bid or offer pooling arrangement, an agreement concerning division of the transferred subject matter ordinarily will be necessary. In the case of pooling owners, an agreement apportioning proceeds will be desirable. Similarly, for pooling purchasers or bidders, division of the transferred rights will be desirable. For this reason, the web site may provide a group of form agreements that govern the rights of pooling parties relative to one another. Alternatively, the parties may formulate their own agreement, which can be executed in advance of the offer or bidding process or following transfer.

Transfer terms may specify an offer and acceptance process whereby the owner entertains individual offers and accepts the most attractive one. The owner preferably sets an initial offer price. As an alternative, transfer terms may call for an auction process, and set a minimum opening bid. In each case, for efficiency, the offer or bid will conform to the terms set forth by the owner. If the owner specifies an up-front payment and running royalties, for example, offers or bids should be made in that form and take into account the particular royalty base set by the owner. As an illustration, bidders may submit bids that offer a specified amount for the up-front payment and a percentage royalty rate applicable to the specified royalty base. Thus, the bidders could vary either of the terms, i.e., up-front or royalty rate, in submitting bids.

Some agreements may be considerably more complex, specifying up-front payments, quarterly minimums, multiple royalty rates applicable to different products, volume discounts, paid up license amounts, and the like. The terms of transfer can range from the mundane to the exotic. In one case, an owner may simply offer assignment of an intellectual property right for a lump sum. In another case, the owner may offer a partial interest ranging, for example, between a non-exclusive license, an exclusive license, a field of use license, and a license for particular products or geographic areas. Specification of the above terms can be facilitated by checkboxes or other input media presented to the owner in the form of web pages generated by the web server.

Still other features can add significant value to the process. In the event a particular transfer item does not entertain sufficient offers or bids during an initial offer or auction period, the web site may provide a mechanism that automatically reduces the opening offer price or minimum bid price of the transfer item. The owner may be contacted in advance of the decrease, or simply permit the reduction to proceed automatically. In some cases, the owner may specify a series of reductions in advance, and also select periods of time between reductions. A transfer item may remain at a particular value for a period of five days, for example, before reduction to the next level. In this manner, the transfer item effectively reduces itself until it reaches a level at which bids or offers are attracted.

As another feature, an automated mechanism may provide for disposal of intellectual property rights short of transfer to a purchaser. Specifically, in the event no offers or bids are collected within a period of time, which may include multiple reductions in price, the web site may automatically record a donation of the rights to a charitable organization. The web server may generate appropriate paperwork for the owner and charitable organization for signature, either manual or electronic. The web server subsequently issues a receipt for the donation indicating the market value of the rights donated. Consequently, the owner of the rights is given a convenient and automated mechanism for deriving value for intellectual property assets. Indeed, some owners may elect to bypass an offer or auction process, and simply donate the assets electronically. The fair market value of the donated rights can be determined by staff associated with the web site administrator or agreed upon by the owner and the charitable organization. It is important to note that the donation mechanism, like many other features of the present invention, is not necessarily limited to transfer of intellectual property assets. Rather, the donation mechanism conceivably can be applied to a variety of different assets including both real and personal property, financial instruments, agreements, and other items.

To increase the number of available transfer items, the web site can be integrated with an automated search mechanism that actively seeks intellectual property rights that may be ripe for transfer. The search mechanism may constitute a web crawler that monitors publicly accessible resources on the network that are likely to yield information concerning distressed assets. For example, the search mechanism may monitor resources that report bankruptcy-related information or financial information for companies. In this manner, the search mechanism may identify parties more likely to be interested in disposing of assets in exchange for monetary consideration.

The crawler can be equipped with necessary intelligence to determine whether the parties are likely to possess substantial intellectual property assets. Upon identification of a company that has entered bankruptcy or is experiencing financial difficulties, the web server can be configured to transmit a message advising the party of the availability of transfer services and inviting the party to submit information concerning its intellectual property rights for transfer. The message can be transmitted, for example, via email, facsimile, or other modes, to actively solicit the addition of items for transfer.

Another feature that can be incorporated in the transfer web site is a transactional "blind" mechanism. For parties seeking rights, this feature serves in avoiding tipping off an intellectual property owner as to a potential infringement. The party seeking a license or other interest simply identifies the rights in which it is interested, and transmits this information to the web server. The web server, in turn, sends a message advising the intellectual property owner of that party's interest in obtaining rights. The identity of the party is maintained in confidence, providing anonymity. The message can simply invite the owner to specify whether it is interested in a potential transfer and, if so, a set of terms including an opening offer price. Alternatively, the party seeking rights may specify an opening offer that is communicated to the owner with the message.

If the owner expresses an interest, the web server generates a series of web pages that prompt the owner for entry of background information. Ultimately, the identity of the party seeking rights must be disclosed. Preliminary investigation on an anonymous basis, however, can permit a party to determine whether the owner has any interest in discussing a transfer. The infomediary plays the role of a "blind" for purposes of investigating a potential transfer, and conceals the identity of the party seeking transfer to avoid tipping off the intellectual property owner.

Other advantages, features, and embodiments of the present invention will become apparent from the following detailed description and claims.

BRIEF DESCRIPTION OF THE DRAWINGS

FIG. 3 is a diagram of a web page illustrating a categorization of intellectual property assets into different intellectual property rights;

FIG. 4 is a diagram of a web page illustrating categorization of an intellectual property category into different technology or industry sub-categories;

FIG. 5 is a diagram of a web page illustrating intellectual property assets listed as items for proposed transfer;

FIG. 6 is a diagram of a web page containing descriptive information for a particular transfer item;

FIG. 7 is a diagram of a web page containing active bidding information;

FIG. 8 is a diagram of a web page containing bid history information;

FIG. 9 is a diagram of a web page communicating a bid in the form of a cross-licensing offer;

FIG. 10 is a diagram of a web page illustrating a list of transfer terms for an intellectual property asset;

FIG. 11 is a diagram of a web page illustrating a dialog for selecting transfer terms;

FIG. 12 is a diagram of a web page containing a dialog for packaging of intellectual property assets owned by an individual;

FIG. 13 is a diagram of a web page containing a dialog for pooling of intellectual property assets owned by two or more parties;

FIG. 14 is a diagram of a web page containing a dialog for interaction with a licensing blind process;

Like reference numbers and designations in the various drawings indicate like elements.

DETAILED DESCRIPTION

Figure 1:
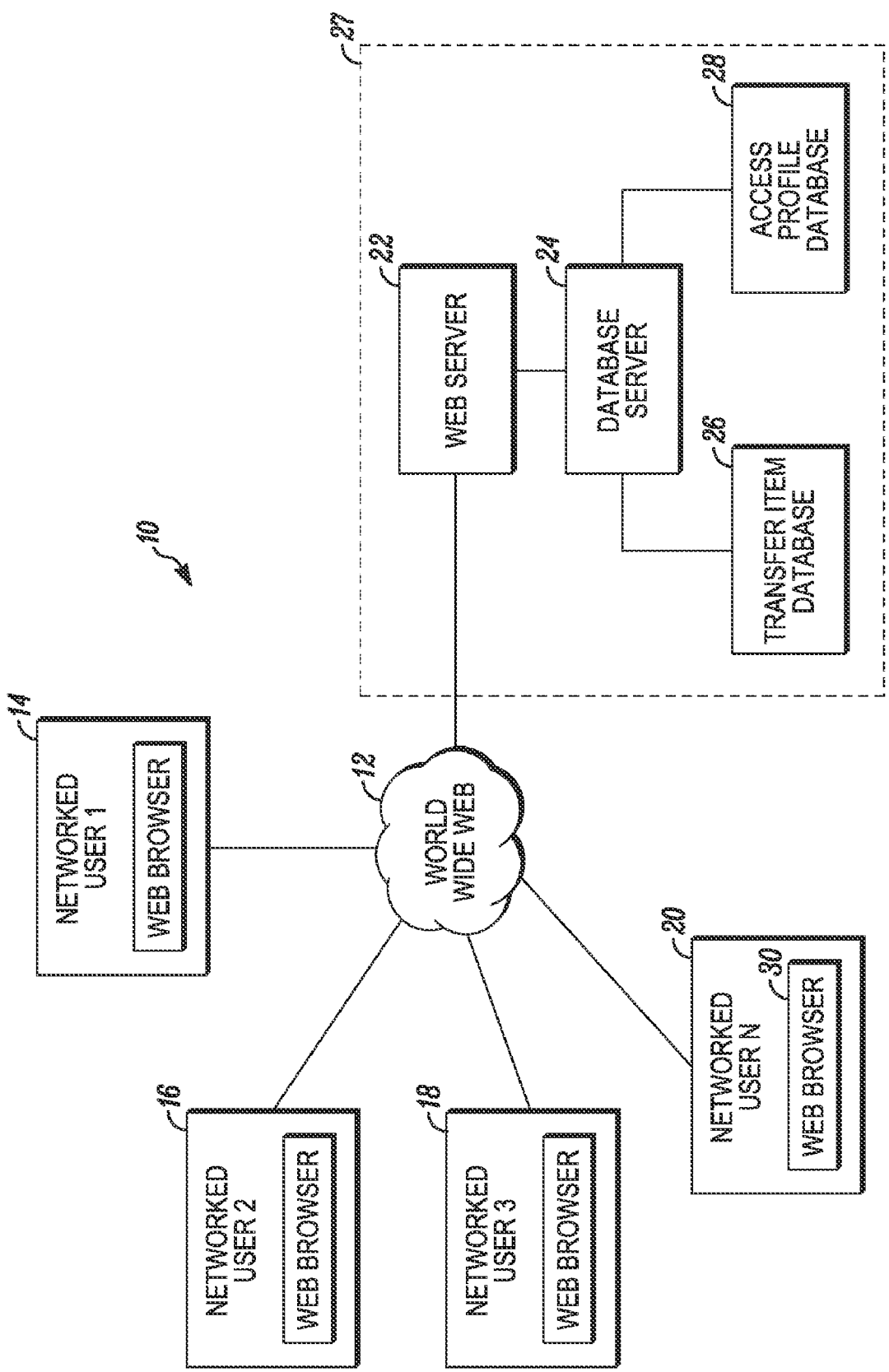
FIG. 1 is a block diagram illustrating a system for facilitating transfer of intellectual property via a global computing network.

FIG. 1 is a block diagram illustrating a system 10 for facilitating transfer of intellectual property via a global computer network, such as the world wide web 12. System 10 can be used to practice methods for facilitating transfer of intellectual property via a global computer network. As shown in FIG. 1, system 10 may include a number of user computers 14, 16, 18, 20, a web server 22, a database server 24, a transfer item database 26, and an access profile database 28. Web server 22, database server 24, transfer item database 26, and access profile database 28 together form ip transfer infomediary 27. User computers 14, 16, 18, 20 and server 22 are connected via a world wide web 12.

Web server 22 administers an auction or offer-acceptance process for transfer of intellectual property, acting as an infomediary between parties seeking to transfer intellectual property assets. For purpose of illustration, the following description places some emphasis on the administration of an auction process. It should be recognized, however, that the web-based infomediary provided by system 10 may be extremely useful in administering an offer-acceptance process in which the ip seller posts an item for transfer at a given offer price, and simply sells to the first ip buyer willing to pay the specified price. In this manner, transfer items may be posted for sale, license, or other transfer without the administration of an auction process with multiple bids.

Web server 22 may take the form of a single web server or multiple web servers, and may execute server page scripts. The scripts can be written as Active Server Pages (ASP) or in other server based scripting languages such as CGI. ASP is bundled with the Microsoft Internet Information Server. ASP code is mixed within HTML in a web page and does not need to be compiled separately. Accordingly, ASP commands can be simply added to pages executed by web server 22 to modify its operation. ASP is especially useful in building database driven websites. In particular, ASP can allow browser users to manipulate databases, e.g., view, edit, and manage, from any browser using HTML and active data objects, and allow HTML web pages to generate database updates.

In operation, web server 22 interacts with database server 24 to provide network users with access to intellectual property information contained in a relational database 26. Web server 22 assembles the necessary content for web pages requested by users, and accepts information from users for addition to database 26. Database server 24 may be any type of server, and simply requires an OLEDB or ODBC driver for interaction with web server 22. In response to queries from web server 22, database server 24 locates appropriate records within database 26. An access profile database 28 defines access profiles that limit the scope of information available to particular network users.

Computers 14, 16, 18, 20 may take the form of personal computers, Macintosh computers, workstations, handheld computing devices, or the like, equipped with telecommunications services for access to network 12. Computers 14, 16, 18, 20 can be connected to network 12 directly or via an interne service provider, and communicate using a network protocol such as TCP/IP. Each computer 14, 16, 18, 20 executes a viewing application such as a web browser 30 to access resources residing on other computers attached to network 12. In particular, web browser 30 permits a network user to view html web pages generated by web server 22.

In system 10, network users include parties who own intellectual property assets such as patents, trademarks, copyrights, trade secrets, mask work rights, domain names, or telephone numbers, or having the right to assign or sublicense agreements with respect to any of such rights. Such parties will be generally referred to herein as ip sellers. Network users also include parties seeking to acquire any of the intellectual property assets described above. Such parties will be generally referred to herein as ip buyers. The ip buyers and sellers connected to system 10 desire to participate in an active auction of offer/acceptance process for the transfer of intellectual property assets. The number of network users in system 10 can be virtually unlimited, although system operation may be subject to bandwidth limitations of server 22 and network 12. IP sellers situated at computers 14, 16, 18, 20 submit information to web server 22 via network 12, and view information pertaining to auction bid status. IP buyers view intellectual property asset information provided by web server 22 and submit bids for purchase or license of intellectual property assets, or assignment of intellectual property agreements.

Each transfer item record in database 26 includes information describing a particular intellectual property asset for which bids will be accepted. The information may include the identity of the ip seller, a detailed description of the asset, hypertext links to other network resources providing additional documentation, projected dates for evaluation and active auction periods, and a minimum opening bid. The level of specificity and volume of information will vary according to the type of asset, but should assist potential bidders in assessing the value of the proposed transfer. If a particular transfer item involves a patent, for example, the information may include hypertext links to electronic copies of the patent, the patent prosecution history, pertinent prior art, pertinent court documents in the event the patent has been subject to legal action, assignment recordation data to reflect a chain of title, any agreements affecting the scope and value of the asset, pertinent products and competitors, and a variety of additional information useful in valuation and due diligence.

The information can be presented in a text or graphic format and, as mentioned above, may include hypertext links to each informational item. Also, the information may include downloadable files, e.g., in PDF format, that convey additional information. Examples of documents that can be conveyed to network users as downloadable files are background items such as invention disclosures, drawings, briefs, opinions, and the like. Notably, the ip seller may also rely on uploaded documents to convey the terms of the transfer, for example, by uploading entire license agreements for review by prospective ip buyers. Again, publicly available information can be obtained by simply linking to a publicly accessible web site. In the case of U.S. prior art patents, for example, the web page may include a link to the United States Patent and Trademark Office web page at www.uspto.gov. Additional prior art can be obtained by linking to web sites associated with other national patent offices.

For submission of an intellectual property asset as a transfer item, an ip buyer accesses web server 22 and selects an appropriate web page. Web server 22 then kicks off a series of interactive web pages requesting user input. A first web page, for example, may request the entry of the ip buyer name, a title for the transfer item, and perhaps a brief description or categorization of the ip asset, e.g., electrical patent or trademark for the beverage industry. Subsequent web pages may request entry of a minimum bid price, a auction date, and adverse parties for whom access to the information should be prohibited. An ip buyer may wish to exclude competitors from bidding, for example, and in many cases prevent the competitors from learning that certain assets are being posted for auction. Other web pages may provide a dialog that prompts the user to define an access profile for the transfer item, as will be described. Further, another web page may prompt the user for any unloadable files that describe the transfer item or transfer terms in greater detail. Background information also can be provided in the form of hypertext links to other web pages. The files are uploaded to the web server or, alternatively, could be uploaded to an ftp server. The dialog driven by the web pages can be aided by conventional input media such as check boxes, radio buttons, pull-down menus, text entry boxes and the like.

Figure 2:
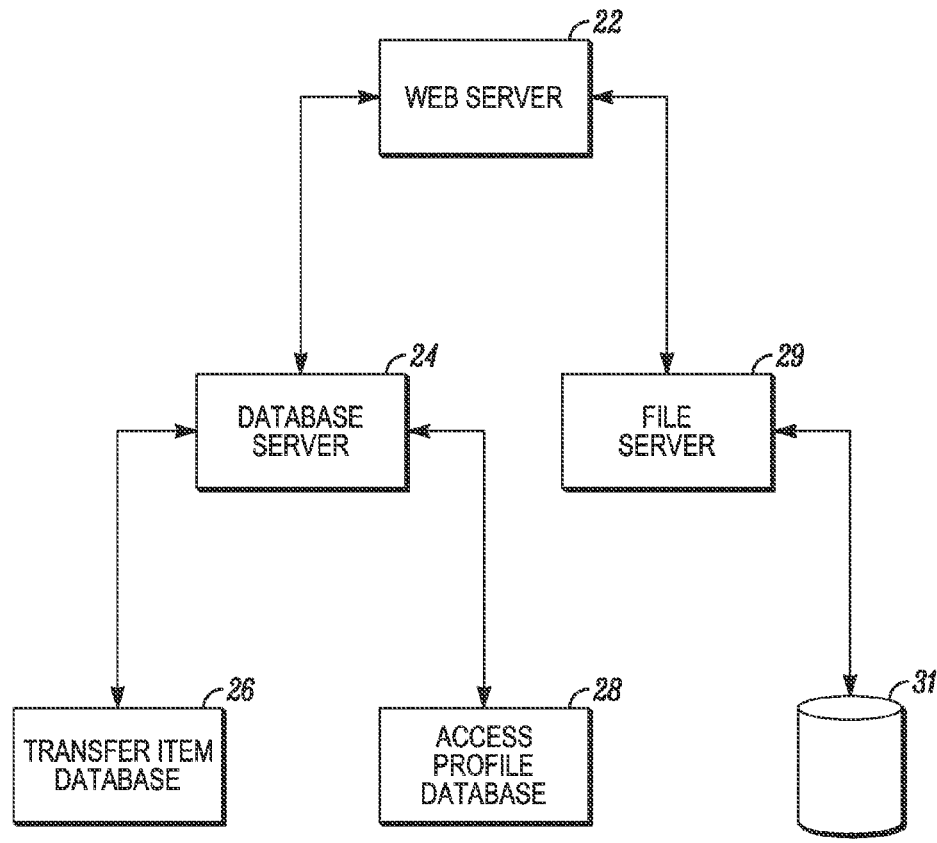
FIG. 2 is a block diagram illustrating the management and generation of intellectual property transfer item information in the system of FIG. 1.

FIG. 2 is a block diagram illustrating management and generation of transfer item information in system 10. Upon receipt of transfer item information from an ip seller, web server 22 interacts with database server 24 to create a record for incorporation in transfer item 26. Web server 22 provides the information to file server 29, which then stores the information in an archive 31 for later retrieval. File server 29 may store several different files for a single transfer item record, particularly when additional files such as agreements or background documentation are uploaded to web server 22 by the ip seller. When a user requests access to the information, web server 22 interacts with database server 24 to retrieve the pertinent transfer item record from database 26 and obtain the addresses of pertinent files stored by file server 29. Web server 22 then retrieves the files and formulates the content of the web page for viewing by the network user.

A firewall preferably is provided as a security measure. The firewall separates database server 24 and file server 29 from web server 22 to avoid unauthorized intrusions into the ip seller. Due to its nature as a repository of information concerning intellectual property assets and transfer terms, the security and confidentiality of database 24 and file server 29 is a serious concern. To promote increased security and confidentiality of transfer item information, web pages generated by web server 22 can be communicated to network users using public key encryption mechanisms such as SSL. Other security measures, such as the use of login accounts for network users, can provide added benefits. In preferred embodiments, however, the information provided by system 10 is accessible without extensive login procedures in order to maintain the level of convenience for which web browsers are known.

Access profile database 28 defines access profiles for transfer items and network users. An access profile for a transfer item is defined by the pertinent ip seller. An access profile for a network user is generally defined by that network user. An access profile serves to limit access to particular information by particular network users. Database server 24 consults access profile database 28 when information is requested by a particular user. At the request of an ip seller, for example, an access profile for a transfer item may exclude certain ip buyers from access to transfer items submitted by the ip seller. Alternatively, at the request of an ip buyer, an access profile may limit the scope of information viewed by the ip buyer to a desired area. For purposes of illustration, FIGS. 1 and 2 show a discrete access profile database 28. In practice, however, a separate access profile database 28 may be unnecessary. Rather, an integrated database schema that takes into account the access profiles of particular transfer items and network users may be sufficient.

An ip seller can specify an access profile for a transfer item to exclude particular network users from access to its transfer item records and participation in the auction process. The access profile for a transfer item serves the basic purposes of limiting access to confidential or sensitive information to authorized ip buyers, or excluding particular ip buyers such as competitors from access. In other words, the access profile may include an inclusive list of ip buyers who are authorized to bid on the transfer item, or an exclusive list of ip buyers who or not. Generation of the access profile may take place as part of the process for submission of the transfer item. In this case, web server 22 may present one or more web pages that request profile information or give the user an opportunity to select a default profile that is either general to all users or formulated for the particular user based on past submissions.

An ip buyer also can define an access profile to limit the scope of information presented, e.g., as part of initial user registration. The access profile can be applied to the individual ip buyers on a global basis, or divided into several sub-profiles that span different technology areas or ip categories. An ip buyer may have one sub-profile that defines access for transfer items in the semiconductor fabrication area, for example, and another sub-profile that defines access for transfer items in the electronic components area, e.g., to exclude access to transfer items from known competitors, which may differ from area to area. In this manner, the access provided to different ip buyers can be highly customized, and adjusted according to individual needs.

The access profile for an ip buyer serves various objectives. In particular, the ip buyer can use the access profile to limit exposure to trade secrets or other confidential information of competitors. To minimize exposure, the ip buyer may request that it not be exposed to transfer items concerning a particular company. Also, the ip buyer may define the access profile to exclude particular technology or business areas in which the ip buyer is not interested. Specific transfer items then can be identified for exclusion based on ip seller name, business area, or technology area, as obtained from fields in the transfer item records stored in database 26.

Moreover, a system administrator may formulate a set of system-wide default profiles that specify particular ip buyers for access to particular transfer items. The system administrator may designate a finite set of ip buyers to access all transfer items in a particular technical area. The default profiles set by the system administrator can make the presentation of information to ip buyers more efficient by limiting the bidding group to parties that are more likely to be interested. At the same time, the system administrator may select ip buyers on the basis of business, technology, and even financial strength, to improve the quality of the bidding group to the benefit of the ip seller.

For purposes of illustration, FIGS. 3-14 show a hierarchy of web pages viewed by a network user in an exemplary embodiment of system 10. FIG. 3 is a diagram of a web page illustrating a categorization of intellectual property assets into different intellectual property rights. In the example of FIG. 3, the web page is entitled "IP EXCHANGE." Upon access to web server 22, the network user may be presented with links to a web page for submission of a transfer item by an ip seller, or for access to pending transfer items, i.e., patents, trademarks, trade secrets, copyrights, mask work rights, web domain names, telephone numbers, or agreements that have been posted for evaluation prior to bidding or are engaged in active bidding. As shown in FIG. 3, when a user desires access to pending transfer items, web server 22 generates a web page that offers the user a choice of different categories of intellectual property. Agreement categories may be subsumed within the particular intellectual property categories to which they pertain. For example, a patent license agreement may be provided in the patent category. Alternatively, agreements may be designated as an individual category. The listing will vary according to the user's access profile, which may exclude certain categories. Some ip buyers may have no interest in mask work rights, for example, while others may have no desire to review trademark-related transfer items. The category titles are represented as hypertext links to other web pages.

Upon selection of one of the hypertext links, the user is presented with another web page devoted to the pertinent category. In the example of FIG. 3, the arrow designates user selection of the patent category. FIG. 4 is a diagram of a web page illustrating categorization of the patent area into either technology areas, e.g., electrical and computer, chemical, biotech, or mechanical, or industries, e.g., interne, software, data storage, semiconductor, imaging, medical devices, biopharmaceutical. Other technology or industry areas will be susceptible to similar sub-categorization. The arrow in FIG. 4 designates user selection of the data storage category.

FIG. 5 is a diagram of a web page illustrating patent rights proposed for transfer in the data storage technology area. In the example of FIG. 5, the data storage technology area of the patent category yields a number of different patents listed by patent owner and patent title. Other information can be provided on the initial web page illustrated by FIG. 5. Such information may be provided, however, via hypertext links to other web pages. To obtain further information concerning item 1, for example, the network user may click on the title of the invention "Magneto-Optic Recording Medium." Subsequent linked web pages may yield a variety of information such as electronic copies or links to the patent, prosecution history, pertinent prior art, and other background documentation helpful in assessing the scope, validity, and resultant value of the patent. To learn more about the patent owner, the network user may click on the name of the patent owner. Subsequent linked web pages may yield a variety of information such as web pages associated with the patent owner, competitors, products, or industries.

FIG. 6 is a diagram of a web page containing descriptive information for a particular transfer item. Upon selection of a particular transfer item, as indicated by the arrow in FIG. 5, the user views a web page that provides additional information as well as a number of links to further information. As shown in FIG. 6, information for the patent entitled "Magnetic Tape Cartridge" may include the pertinent patent number and a brief description of the proposed transfer, e.g., assignment of the patent, assignment of a patent license agreement, grant of an exclusive license, or grant of a nonexclusive license. Further, as shown in FIG. 6, the information may include the names of the inventors, the dates of the active bid period, a minimum bid, and links to a number of items including transfer terms, which may take the form of one of several form agreements provided by the system administrator, a customized agreement formulated on-line by the ip seller, or a customized agreement that is uploaded to web server 22 by the ip seller.

Also, the information may include hypertext links to other network resources providing information such as pertinent prior art, related patents, the patent prosecution history, and the home web page for the ip seller. In the example of FIG. 6, the proposed transfer involves assignment of an existing patent license agreement between XYZ Corp and ABC Corp. For example, XYZ may be the licensor, and may desire to assign the agreement along with an associated prospective royalty stream in consideration of a sum calculated by discounting the estimated net present value of the royalty stream. Accordingly, the information also may include links to an electronic copy of the pertinent license agreement, past royalty reports, and a link to the ABC home web page. Links also can be provided to allow the ip buyer to request more information or enter the bidding process in the event it is already underway. Following selection of the "Enter Bidding" link, the user views a web page such as that shown in FIG. 7. In particular, FIG. 7 is a diagram of a web page containing active bidding information. In addition to background information provided as shown in FIG. 6, the web page of FIG. 7 includes a dialog box that displays the current high bid, and provides a text entry box for entry of a bid by the present ip buyer and a button for submission of the bid. As will be explained, system 10 may provide the capability to perform a cross-licensing transaction, in which case the ip buyer may offer a cross-license to certain ip assets in lieu of the transfer terms proposed by the ip seller. For this reason, the dialog box also may include a "X-License" button to initiate entry of the cross-license terms by the ip buyer.

FIG. 8 is a diagram of a web page containing bid history information for review by the ip seller. Disclosure of bids among ip buyers may or may not be desirable, and will be a matter of design for the system administrator, or perhaps a matter of choice for the ip seller. In any event, the ip seller can access a web page as shown in FIG. 8 to review the bids submitted by ip buyers. In most embodiments, the ip seller will be required to accept the high bid. In some embodiments, however, the ip seller may reserve the right to select a lower bid. The ip seller may want to accept a lower bid, for example, based on considerations of the competitive posture of the ip buyer relative to the ip seller or the perceived financial strength of the ip buyer. In this manner, the ip seller can exercise discretion before transferring its intellectual property rights to an undesirable bidder such as a direct competitor. Of course, in some embodiments, the use of access profiles may serve to exclude direct competitors from the bidding process altogether.

FIG. 9 is a diagram of a web page communicating a bid from an ip buyer in the form of a cross-licensing offer. As shown in FIG. 9, the proposed cross-licensing offer information detailed on the web page may specify another intellectual asset, such as a patent, and provide much of the same information as provided for any transfer item. For example, the cross-licensing offer may specify the name of the bidder, the pertinent patent number or numbers, and provide links to electronic copies of the patents, prior art, prosecution histories, and license agreements. Negotiation of the cross-license terms ordinarily will require added dialog between the ip buyer and seller, which can be facilitated by email or a chat mechanism, or take place over the phone. Concentration of the necessary cross-licensing information in a single web page or collection of web pages, however, will serve to initiate the process and allow the ip buyer to determine whether further discussions are warranted, or whether the cross-licensing offer should be dismissed out of hand.

FIG. 10 is a diagram of a web page illustrating a list of transfer terms for an intellectual property asset. As an alternative or in addition to a fully-developed transfer agreement, the ip seller may post a set of transfer terms that outline the proposed transfer. By clicking on the transfer terms link, the ip buyer can obtain ready access to this condensed version of the deal. As illustrated in FIG. 10, the transfer terms may specify the scope of the license in terms of nonexclusive or exclusive, any fields to which the assignment or grant will be limited or excluded from, applicable royalty rates and bases, the duration (term) of the agreement, any up-front payments, any support or technology transfer obligations, and any other terms that the ip seller may wish to communicate to bidders. The "other" terms may conform, for example, to a default list of terms specified for each type of transaction and set by the system administrator for selection by ip sellers.

FIG. 11 is a diagram of a web page illustrating a dialog for selecting transfer terms. Upon access to web server 22, the ip seller selects a link for submission of a transfer item. Following submission of background information, the ip seller may set the terms of transfer by uploading a custom agreement, selecting one of several form agreements provided by the system administrator, or initiating a dialog as shown in FIG. 11 for selection of individual terms. The dialog takes the form of a menu that can be equipped with conventional input media such as radio buttons, check boxes, sliders, pull-down menus, text entry boxes, and the like. In this manner, the ip seller can enter transfer terms by checking boxes and selecting from a variety of stock terms provided on the menu. Accordingly, the selection of transfer terms can be made extremely convenient for the ip seller. This web page ordinarily will include a link that permits incorporation of custom terms in addition to the stock items.

FIG. 12 is a diagram of a web page containing a dialog for packaging of intellectual property assets owned by an individual. An ip seller may wish to "package" separate intellectual property rights for transfer. In this manner, a number of related intellectual property rights, perhaps representing a particular technology portfolio, can be combined for placement with a single entity. The matters could be combined, for example, on the basis of similarity of technology or product line. Also, a company could package all of the intellectual property rights for a particular business, or package a number of related license agreements to increase overall package value based on cumulative royalty streams. Alternatively, a number of generally unrelated rights can be packaged simply on the basis of convenience.

As shown in FIG. 12, packaging can be facilitated by a web page that displays all of the transfer items pending for a particular ip seller. In the example of FIG. 12, ABC Corp. has a number of different intellectual property assets posted for transfer and ranging from patents to copyright to agreements. Each transfer item may be associated with a check box that, in contrast to a radio button, permits selection of multiple transfer items for packaging. The ip seller simply clicks on the group of transfer items to be packaged, and clicks on a submit button. In response, web server 22 associates the transfer items and generates a web page for formulation of transfer terms with respect to the package. The transfer items thereafter are presented as a package, and enter the auction phase as a package for evaluation by ip buyers.

FIG. 13 is a diagram of a web page containing a dialog for pooling of intellectual property assets owned by two or more parties. In the example of FIG. 13, an ip seller can enter a pooling dialog in which a party or parties with whom the seller wishes to pool assets is selected. Following this selection, the web page displays the transfer items for the initial ip seller and the party with whom pooling is desired. Using check boxes, for example, the ip seller selects a group of transfer items from each party for pooling. Following submission of the proposed pool, the other party is notified, facilitating discussion between the parties for acceptance, rejection, or further negotiation of the terms of the pool. The transfer items are posted together as a pool in the event the parties come to agreement.

FIG. 14 is a diagram of a web page containing a dialog for interaction with a licensing blind process. In this case, infomediary 27 facilitates anonymous or semi-anonymous dialog between prospective ip sellers and buyers, particularly when infringement claims are a concern. For parties seeking rights, for example, this feature serves in avoiding tipping off an intellectual property owner as to a potential infringement. The party seeking a license or other interest simply identifies the rights in which it is interested, and transmits this information to web server 22. Web server 22, in turn, sends a message advising the intellectual property owner of that party's interest in obtaining rights. The identity of the party is maintained in confidence, providing anonymity. This process can be facilitated by a simple web page, as shown in FIG. 14, by which the prospective ip buyer describes a target asset by entering pertinent patent numbers, countries in which the patents are in force or which are of interest, assignees if known, and initial terms or other parameters if desired. Also, the ip buyer may have the option of disclosing its identity immediately, or reserving its identity until it becomes apparent that the ip seller's terms are likely to be within a comfortable margin of the ip buyer's terms. Following submission of the blind information, web server 22 initiates contact with the ip owner and invites that entity to enter into initial discussions. In the event the ip buyer provides a set of initial terms, and such terms are wholly unacceptable, the ip owner may simply decline further discussions.

Figure 15:
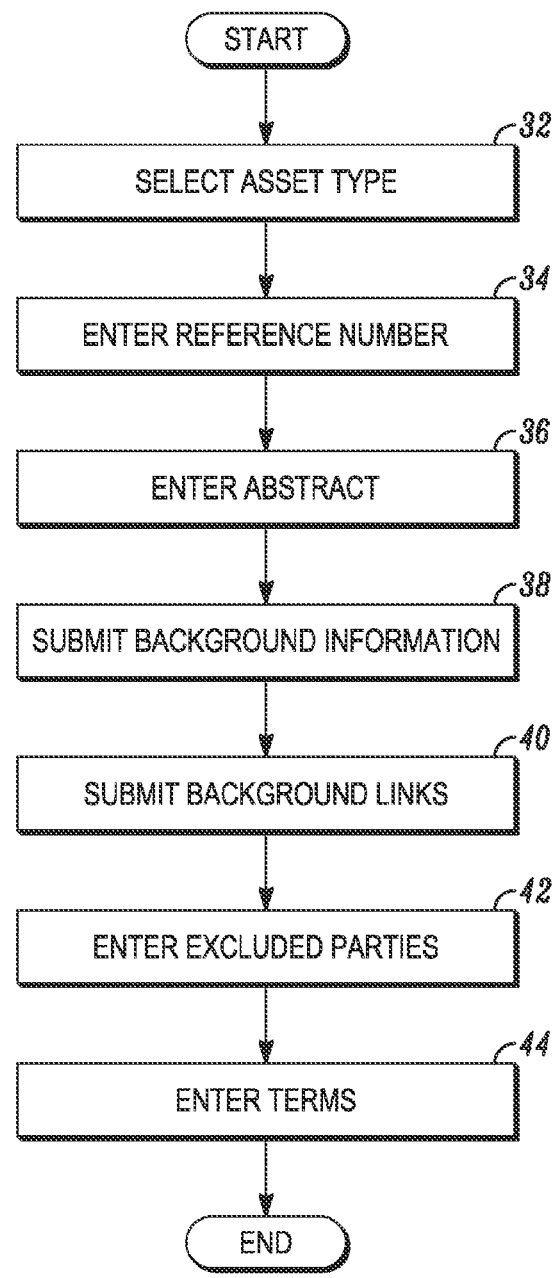
FIG. 15 is a flow diagram illustrating submission of an intellectual property asset for transfer.

FIG. 15 is a flow diagram illustrating submission of a transfer item by a client for the bidding process. The order of events illustrated in FIG. 15 is purely exemplary. Submission preferably is guided by a series of web pages generated by web server 22 that query the client for appropriate information. In another embodiment, the client may submit one or more transfer items using an ftp session initiated by the client with an ftp server residing in system 10. Submission of transfer items to web server 22 will be described with respect to FIG. 15. As indicated by block 32, the client first selects an asset type, which may involve navigation through a hierarchy of ip categories, technology areas, industry areas, and so forth. Following selection of the asset type, the user may enter a reference number for the asset, as indicated by block 34, such as a patent number, registration number, or a simple ad hoc reference number created by the ip seller. Next, as indicated by block 36, the ip seller may enter a brief abstract of the transfer item. The abstract can be entered manually or uploaded to web server 22. As indicated by block 38, the ip seller may submit a number of background documents that describe the transfer item in greater detail. For example, the user may be prompted to upload documents such as agreements, royalty reports, briefs, legal memoranda, invention disclosures, and the like. As indicated by block 40, the user also may provide links to other network resources that contain information such as patents, prosecution histories, and prior art, in the case of a patent-related transfer item.

As further shown in FIG. 15, the ip seller then may set the access profile for the particular transfer item, for example, by entering a list of excluded parties, as indicated by block 42. In particular, the ip seller may specify a number of competitors or other undesirable bidders who are to be excluded from access to information concerning the transfer item. Also, in some embodiments, the ip seller may submit an inclusive list of ip buyers who are desired bidders, and who are to be notified of the posting of the transfer item for auction. Finally, as indicated by block 44, the ip seller may enter the terms of the transfer, e.g., using a web page dialog as described with reference to FIG. 11, selecting form agreements, or uploading custom agreements. In addition to the items described with reference to FIG. 15, the ip seller may enter additional information such as desired auction dates, packaging instructions, and reduction dates for reduction of the minimum bid.

Figure 16:
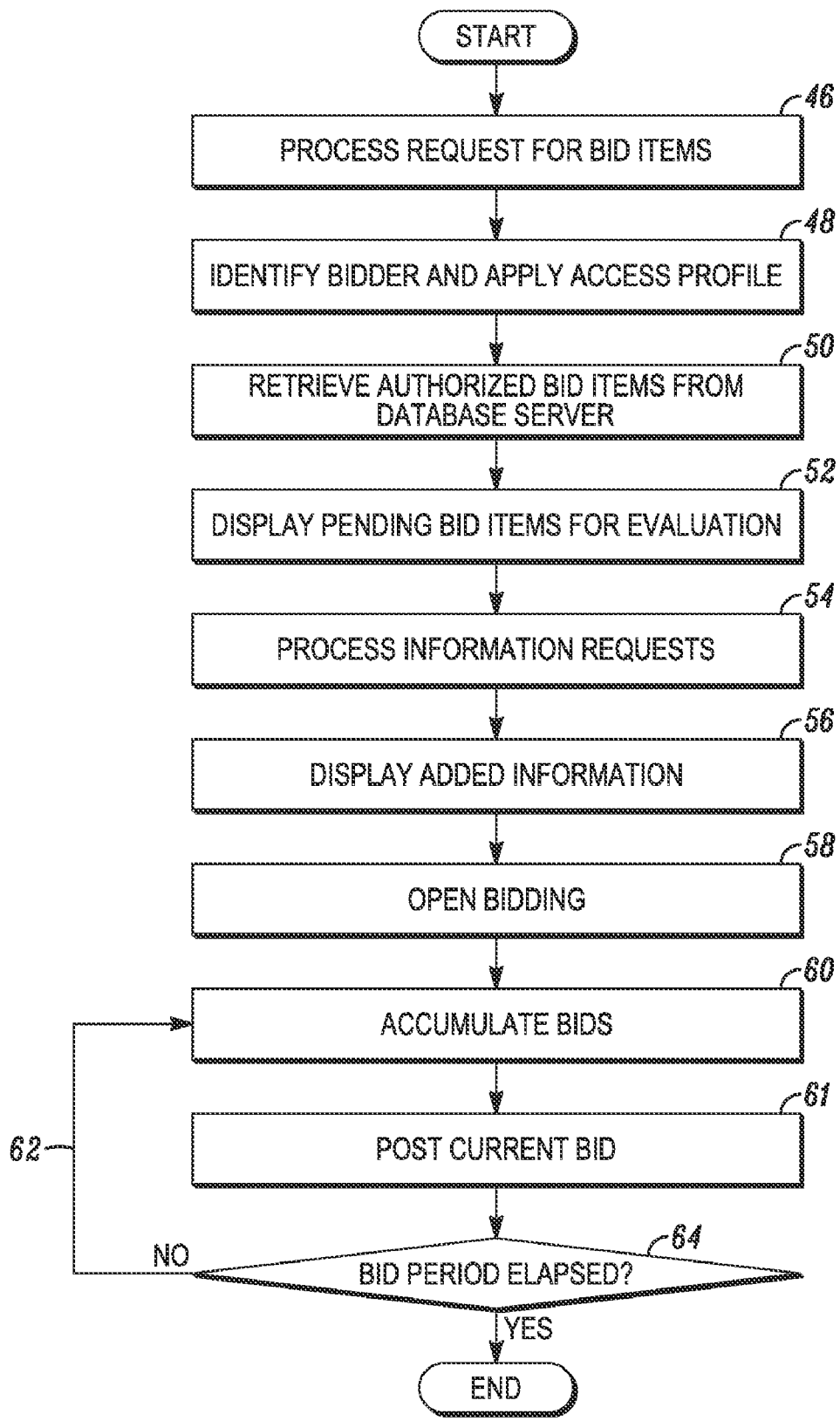
FIG. 16 is a flow diagram illustrating the execution of a bid process for transfer of an intellectual property asset.

FIG. 16 is a flow diagram illustrating the execution of a bid process for transfer of an intellectual property asset. Upon receipt of a request to view transfer items for bid, as indicated by block 46, web server 22 interacts with database server 24 to identify the particular bidder and retrieve the pertinent access profile, as indicated by block 48. The bidder can be identified, for example, by a cookie or other device passed to computer 14, 16, 18, 20 used previously by the bidder to access web server 22, or by a log-in process. Based on the access profile, web server 22 retrieves a number of authorized transfer items for bid (block 50), i.e., transfer items consistent with the access profile, defined by transfer item records residing on database 26. The transfer items may be further limited by the ip buyer's selection of particular categories and subcategories of transfer items during navigation of the web pages generated by web server 22. The number of options listed on each web page may be limited, however, by the access profile.

As indicated by block 52, web server generates a web page that displays the pending transfer items for evaluation by the ip buyer. The ip buyer may view the information associated with each of the transfer items by hypertext navigation. Also, for each transfer item, the ip buyer may enter a request for further information that is processed by web server 22, as indicated by block 54. Upon notification of the client and receipt of the requested information, web server 22 updates the information and makes it available to the ip buyer, as indicated by block 56. The ip buyers may periodically visit and refresh the pertinent web page to check for the added information. Alternatively, web server 22 may notify the ip buyer, via email or page, when the information has been added.

After an evaluation period, if any, has elapsed, web server 22 generates an active bid page that can be accessed by ip sellers and opens the bidding process, as indicated by block 58. Again, web server 22 can be configured to notify interested ip buyers when bidding opens. During the bidding process, web server 22 accumulates bids from ip buyers, as indicated by block 60, and posts the current high bid on the active bid page accessed by the ip buyers, as indicated by block 61. Web server 22 continuously accepts bids, as indicated by loop 62, until the bid period elapses, as indicated by block 64. At that time, the ip buyer with the highest bid generally will be awarded the transfer item subject to the basic terms specified by the ip seller. Alternatively, the ip seller may reserve the right to select a lower bid. Upon selection of a bid by the ip seller, web server 22 sends a notification to the ip buyer that submitted the bid.

Figure 17:
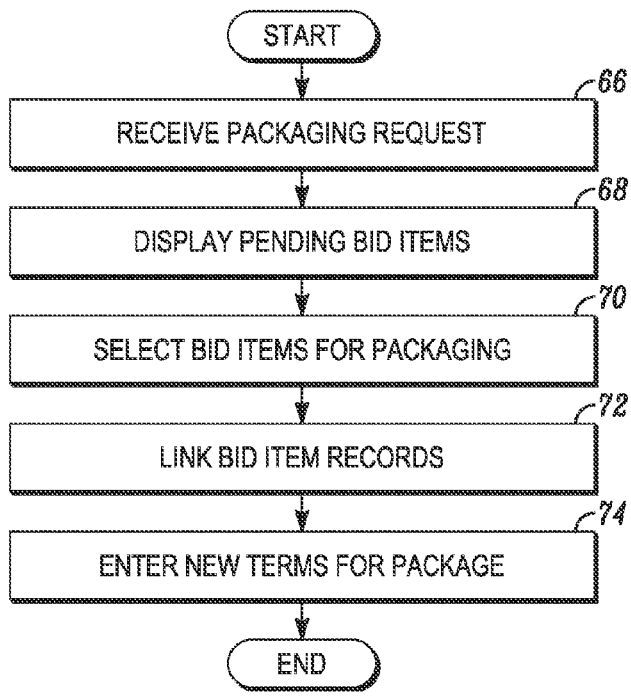
FIG. 17 is a flow diagram illustrating packaging of transfer items by an individual.

FIG. 17 is a flow diagram illustrating packaging of transfer items by an individual ip seller. As shown in FIG. 17, an ip seller may submit a packaging request to web server 22, as indicated by block 66. In response, web server 22 generates a series of web pages that prompt the ip seller for identification of particular transfer items to be packaged. As indicated by block 68, web server 22 then displays the pending transfer items. In particular, web server 22 may display the pending transfer items for the respective ip seller, and permit "checkbox" selection of individual items for packaging, as indicated by block 70, and as described with reference to FIG. 12. Following selection, web server 22 may link the transfer item records in database 26 associated with the specified transfer items, as indicated by block 72. For example, web server 22 may associate the records in the tables maintained by database server 24. Next, the ip seller enters terms for the transfer of the package of transfer items, as indicated by block 74. In response to requests from ip buyers, web server 22 then posts information for the packaged bid items together. In this manner, the packaged bid items can be displayed together on a single web page for evaluation by bidders.

Figure 18:
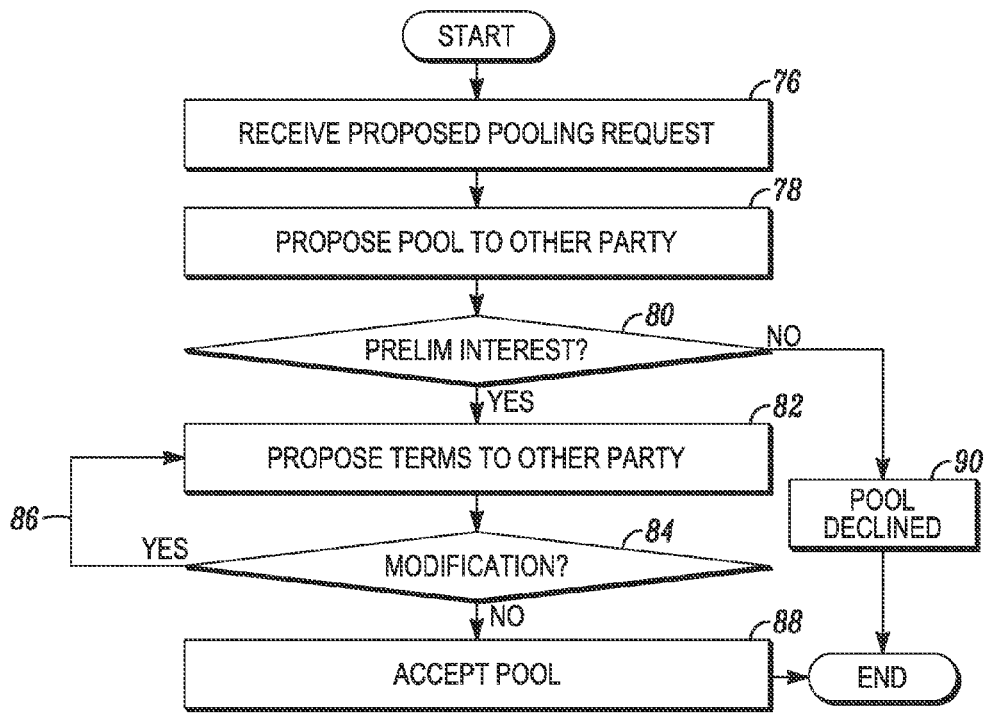
FIG. 18 is a flow diagram illustrating pooling of transfer items by two or more individuals.

FIG. 18 is a flow diagram illustrating pooling of transfer items by two or more individuals. System 10 may allow ip sellers to pool their transfer items with one another, increasing the volume and scope of an overall ip offering. To enable pooling of bids, particular ip sellers may agree to exchange information for review purposes, e.g., by allowing access to transfer item records contained in database 26. For example, two or more different universities may agree to exchange information in a particular technology area for purposes of obtaining bids intellectual property assets directed to related technologies. In many cases, an extensive information exchange will not be necessary. Web server 22 may be arranged to generate a web page for all ip sellers that sets forth a directory of ip sellers who are amenable to pooling.

Upon identification of one or more different ip sellers for potential pooling, an ip seller submits a proposed transfer item pooling request to web server 22, as indicated by block 76. In response, web server 22 generates a message, e.g., an email or posting to a web page, that communicates the request to the prospective pooling seller, as indicated by block 78, which requests that the prospective pooling seller indicate whether there is any potential interest, as indicated by block 80. In the event the message is posted to a web page, it may be posted, for example, to a user account web page that the ip seller visits on a frequent basis. Along with the message, web server 22 includes preliminary information concerning the proposed pool such as the particular transfer items implicated by the pool. If the prospective pooling seller declines the proposed pool, as indicated by block 90, web server 22 terminates the process and posts the transfer items individually.

If the prospective pooling seller expresses preliminary interest, however, web server 11 may transmit a set of preliminary transfer terms, as indicated by block 82. Web server 22 may give the prospective pooling seller the opportunity to modify the terms, as indicated by block 84, in which case the modified terms are then transmitted to the other party, as indicated by loop 86. This process may continue via the infomediary, e.g., by email or web page posting, or by more conventional means such as telephone discussions. In any event, the process continues until the parties have no further modifications and the pool is accepted, as indicated by block 88.

In particular, the web site may provide a group of form agreements that govern the rights of pooling parties relative to one another. Alternatively, the parties may formulate their own agreement, which can be executed in advance of the offer or bidding process or following transfer. Of course, the parties may be unable to reach an agreement, and ultimately may decline the pool. If the pool is accepted, however, web server 22 interacts with database server 24 to associate the pertinent transfer item records in database 26 as a pool. Web server 22 subsequently generates a web page for review by ip buyers that contains links to the pooled transfer items. The ip seller submitting the chosen bid is then entitled to transfer of the all of the pooled transfer items.

Figure 19:
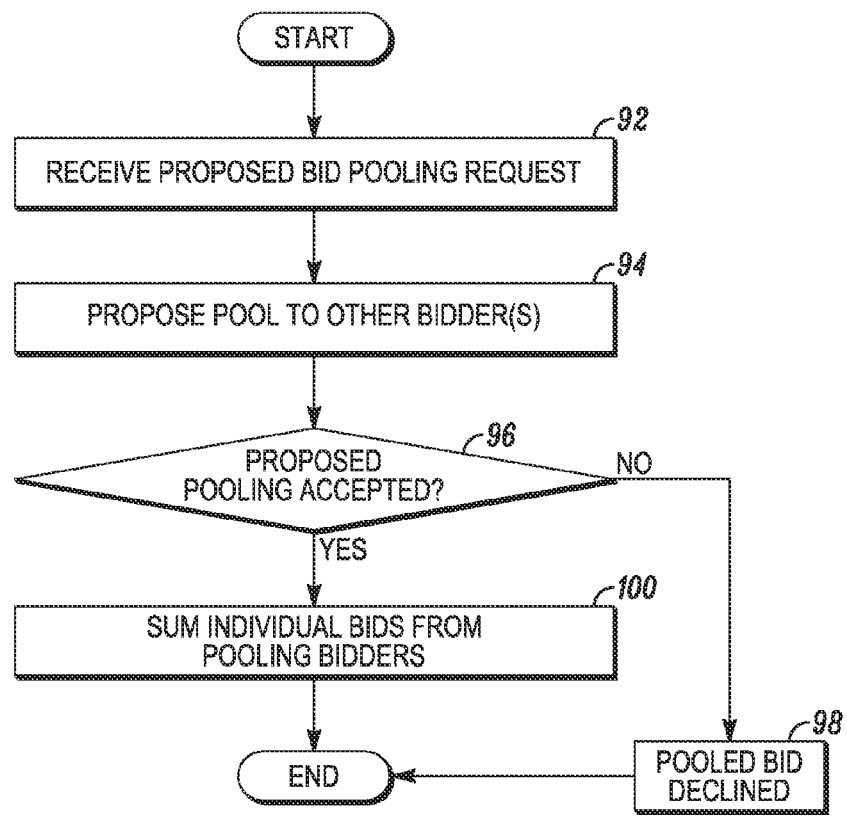
FIG. 19 is a flow diagram illustrating pooling of offers or bids by two or more individuals.

FIG. 19 is a flow diagram illustrating pooling of bids by two or more ip buyers. System 10 may permit ip buyers to pool bids with respect to an individual transfer item or transfer item package or pool. When a large package or pool of transfer items is posted for bidding, smaller companies may pool their bids even if their individual resources are insufficient to take on the entire package or pool. With bid pooling, smaller buyers can obtain access to larger or more valuable intellectual property assets provided they can reach agreement concerning allocation or sharing of the resultant rights. When the companies desire to manufacture different components of an overall product, for example, access to applicable intellectual property rights can be mutually beneficial. In this manner, smaller or more narrowly focused companies can compete with larger, more diversified companies.

Web server 22 may facilitate the bid pooling process by providing a communication mechanism between prospective bid poolers. When web server 22 receives a proposed bid pooling request from an ip buyer, as indicated by block 92, it forwards the request to other ip buyers identified in the request, as indicated by block 94. This process may take place via email communication, posting to a web page, or other means. The ip buyer may, for example, identify one or more other buyers for bid pooling. In most cases, the ip buyer will identify a particular transfer item, package, or pool to which the pooled bids will be directed. In other words, the ip buyers ordinarily will not pool bids for all transfer items, but rather target their pooled bids toward transfer items that are attractive to all pooling parties. If the proposed bid pooling is not accepted by any of the ip buyers, as indicated by block 96, the pooled bid is declined by web server 22, as indicated by block 98.

If the proposed pooling is accepted, however, web server 22 records the pool. Then, during the auction process, web server 22 sums the individual bids submitted by the pooling bidders, as indicated by block 100, to produce an aggregate bid. During the auction process, this aggregate bid is compared to other bids to determine which is highest. Alternatively, the pooling bidders may elect one of the bidders to submit a collective bid for the entire pool. In either case, the parties in the bid pool take the transfer item together and must arrive at terms for disposition of the item among them following the auction. This process, also, can be facilitated via the web-based infomediary. Again, the web site may provide a group of form agreements that govern the rights of pooling parties relative to one another. Alternatively, the parties may formulate their own agreement.

Figure 20:
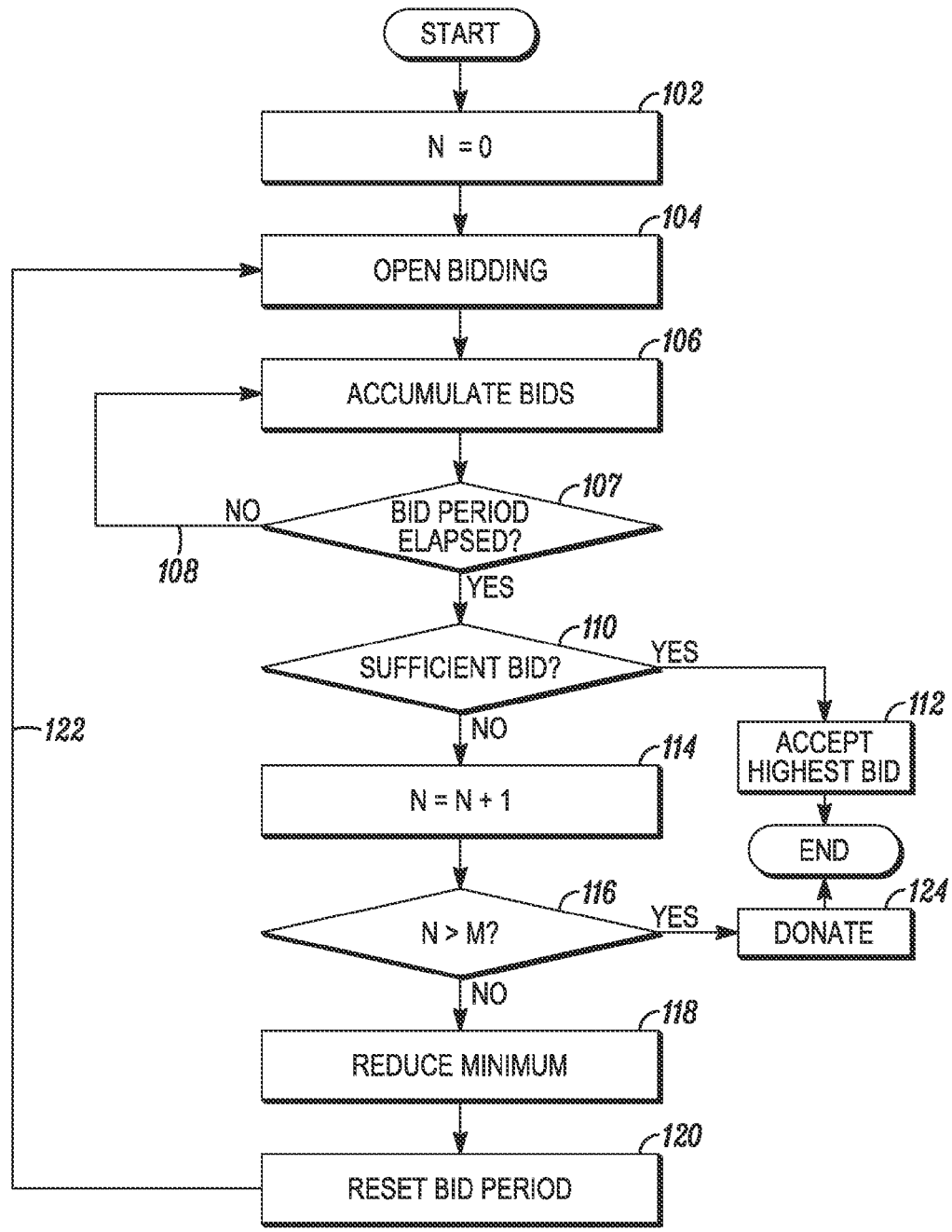
FIG. 20 is a flow diagram illustrating a process for a modification of terms or donation of a transfer item.

FIG. 20 is a flow diagram illustrating a process for a modification of terms or donation of a transfer item. In the event a particular transfer item does not entertain sufficient offers or bids during an initial offer or auction period, the web site may provide a mechanism that automatically reduces the opening offer price of minimum bid price of the transfer item, or ultimately facilitates donation of the item to a charitable organization for purposes of obtaining a tax benefit. In the example of FIG. 20, a counter N is set to zero, as indicated by reference numeral 102, prior to the open of bidding, as indicated by block 104. As web server 22 accumulates bids, as indicated by block 106, it is periodically determined whether an applicable bid period has elapsed, as indicated by block 107. The bid period may run for a period of weeks or days, for example, and can specified by the ip seller. If the bid period has not elapsed, web server 22 continues to accumulate bids, as indicated by loop 108 and block 106.

Once the bid period elapses, however, web server 22 determines whether a sufficient bid has been submitted, as indicated by block 110. A sufficient bid would be a bid that, for example, meets or exceeds an applicable minimum bid or offer prices. If a sufficient bid has been submitted, the highest bid can be accepted, as indicated by block 112. Alternatively, the ip seller may choose one of the lower bids, if there are several, based on other considerations. If the bid period has elapsed and no sufficient bids have been submitted, the counter N is incremented, as indicated by block 114. Value M is indicative of the maximum number of price reductions and resultant additional auction periods desired by the ip seller. If counter N does not exceed value M (block 116), web server 22 reduces the minimum bid or offer price of the transfer item, as indicated by block 118, with the objective of attracting additional bids in a new auction or offer period. The reduction may be automatic and predetermined by the ip seller. Alternatively, the ip seller may be contacted in advance of each reduction.

Upon reduction of the minimum offer or bid, the bid period is reset, as indicated by block 120. Then, as indicated by loop 122, a new period is opened, and the process is repeated. After the number of bid periods indicated by counter N has exceeded value M, and solicitation of acceptable bids or offers has been unsuccessful, the transfer item is simply designated for donation to a charitable organization, as indicated by block 124. Thus, in the event no acceptable offers or bids are collected within a period of time, which may include multiple reductions in price, web server 22 may automatically record a donation of the rights to a charitable organization. Web server 22 may automatically generate appropriate paperwork for the owner and charitable organization for signature, either manual or electronic, and thereby document the transfer and issue a receipt.

Some ip sellers may elect to bypass an offer or auction process, and simply donate the assets electronically, given the convenience provided by system 10. The fair market value of the donated rights can be determined by staff associated with the web site administrator or agreed upon by the ip seller and the charitable organization. The ip seller may select the charitable organization in advance, e.g., by radio button selection from a list of several charitable organizations. Alternatively, designation of the charitable organization may be left to the system administrator. In any event, system 10 provides a convenient mechanism for deriving tax benefits from intellectual property assets, or other types of assets such as real and personal property, financial instruments, agreements, and the like. Disposal of the asset by the charitable organization then can be facilitated by system 10, e.g., by designating the assets for a "clearance" or "fire sale" auction.

Figure 21:
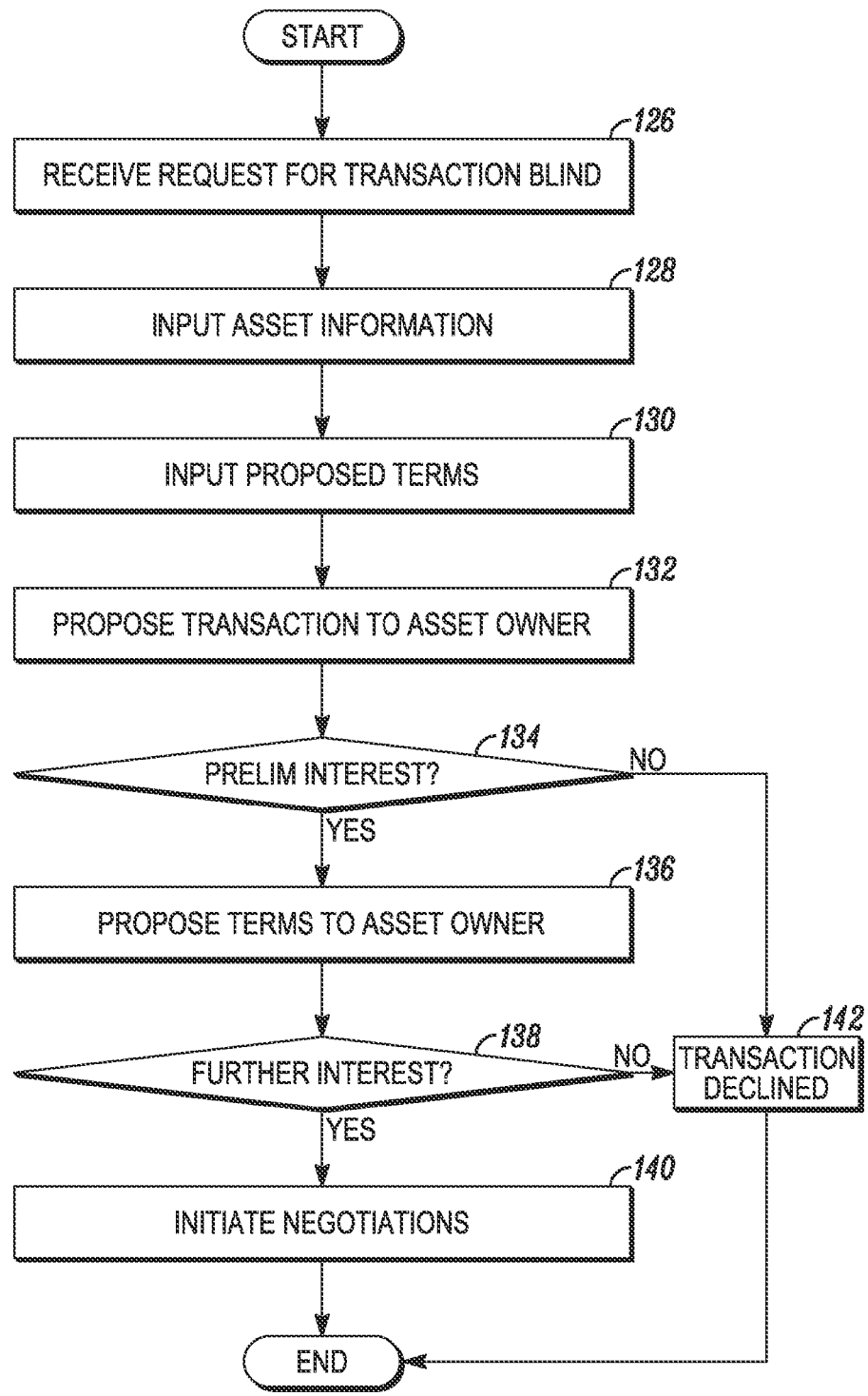
FIG. 21 is a flow diagram illustrating operation of a transactional blind process.

FIG. 21 is a flow diagram illustrating operation of a transactional blind process. This feature will be desirable for parties who seek access to particular intellectual property assets, but wish to avoid tipping of the intellectual property owner as to a potential infringement. Instead, this feature may provide a preliminary mechanism for ascertaining the posture of an intellectual property owner with respect to the granting of licenses or other interests. Upon receipt of a request from a transaction blind, as indicated by block 126, web server 22 may require input of information by the requester. As indicated by block 128, for example, web server 22 ordinarily will require input of asset information identifying the asset, e.g., by patent number, registration number, or other description, and the party believed to be the owner of the asset. Further, as indicated by block 130, web server 22 may require a set of proposed terms for transfer of an interest in the asset, e.g., nonexclusive license, exclusive license, or assignment, along with a proposed royalty or payment structure, and fields of use, if applicable. In some cases, the ip buyer may elect to forego terms.

Following entry of the necessary information, web server 22 generates a message by which the proposed transaction is transmitted to the intellectual property owner, e.g., by email, web page posting, or other means, as indicated by block 132. The intellectual property owner is advised to respond in the event there is preliminary interest (block 134) in discussing the proposed transaction. If the intellectual property owner expresses preliminary interest, proposed terms for the transaction are provided, as indicated by block 136. If the intellectual property owner, based on the proposed terms, expresses further interest (block 138), the parties may initiate face-to-face negotiations, as indicated by block 140. At this time, the identity of the prospective ip buyer typically will be disclosed, and the parties will proceed with negotiation via email, chat facility, telephone, or otherwise. If the intellectual property owner expresses no interest, either preliminary or following review of the proposed terms, the proposed transaction is declined, as indicated by block 142. Advantageously, if the transaction is declined at either of the first two stages, the identity of the prospective ip buyer is never revealed.

Figure 22:
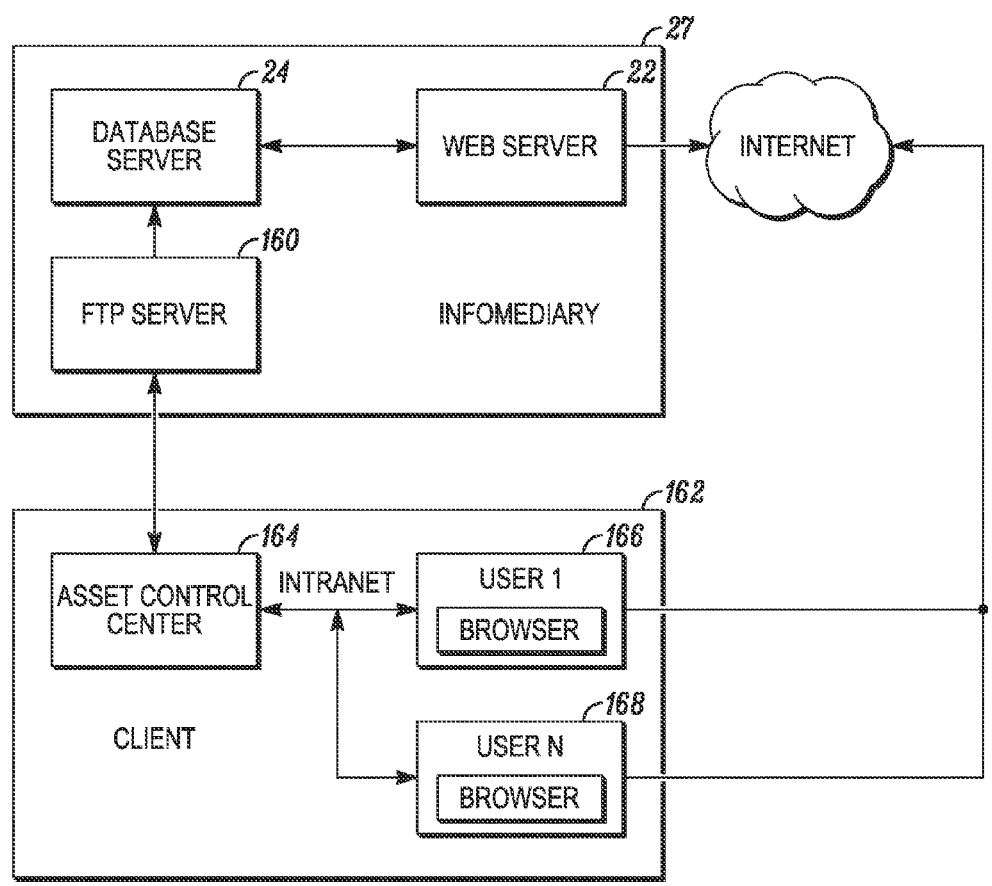
FIG. 22 is a block diagram illustrating a system for uploading of information 5 pertinent to an intellectual property asset from a client to an infomediary.

FIG. 22 is a block diagram illustrating a system for uploading of information pertinent to an intellectual property asset from a client to an infomediary 27. In the system shown in FIG. 22, ip sellers may submit transfer item information to web server 22 via a web browser. In particular, clients may submit individual transfer items and packages by navigating a series of web pages generated by web server 22 for submission of the necessary information. Alternatively, submission of transfer item information can be conducted on a more systematic basis. As shown in FIG. 22, for example, clients can be equipped with an internal intranet system 162 that includes one or more client computers 166, 168 with web browsers and an asset control center application 164 that collects transfer item information from intranet users, maintains and updates the information, and uploads information to infomediary 27 on an automated basis.

With further reference to FIG. 22, bid infomediary may include not only web server 22 for interaction with clients via http protocol, but also an ftp server 160 for automated interaction with asset control center 164. Each server 22, 160 interacts with database server 24 to add or modify information for the bid process. Asset control center 164 may include an intranet server that generates web pages for viewing by users situated at computers 166, 168. For submission of transfer items, for example, the intranet server may generate web pages analogous to those generated by web server 22 for submission of transfer items via the internet. Asset control center 164 also includes a database, database server, and file server for local storage of the information submitted by the client's individual users. On a regular basis, or as directed by a client user, asset control center 164 opens an ftp session with ftp server 160 to transfer new transfer item information or update or supplement transfer item information previously uploaded to the ftp server.

On the basis of the uploaded information, infomediary 27 creates or updates transfer item records defining bid items. Thus, intranet system 162 and asset control center 164 provide a systematic mechanism for uploading information for several transfer items en masse or for individual transfer items on a selective basis. One advantage of this approach is that the transfer item information may be maintained by asset control center 164 for other reasons than entering the auction or offer process. In particular, a larger body of transfer item information may be accessed by client users for purposes of docketing, portfolio management, planning and the like. Selected transfer items then may be earmarked by ip sellers for submission to the auction or offer process. As further shown in FIG. 22, along with intranet access and ftp uploads, ip sellers still may have the option of submitting transfer item information to web server 22 via the internet.

Figure 23:
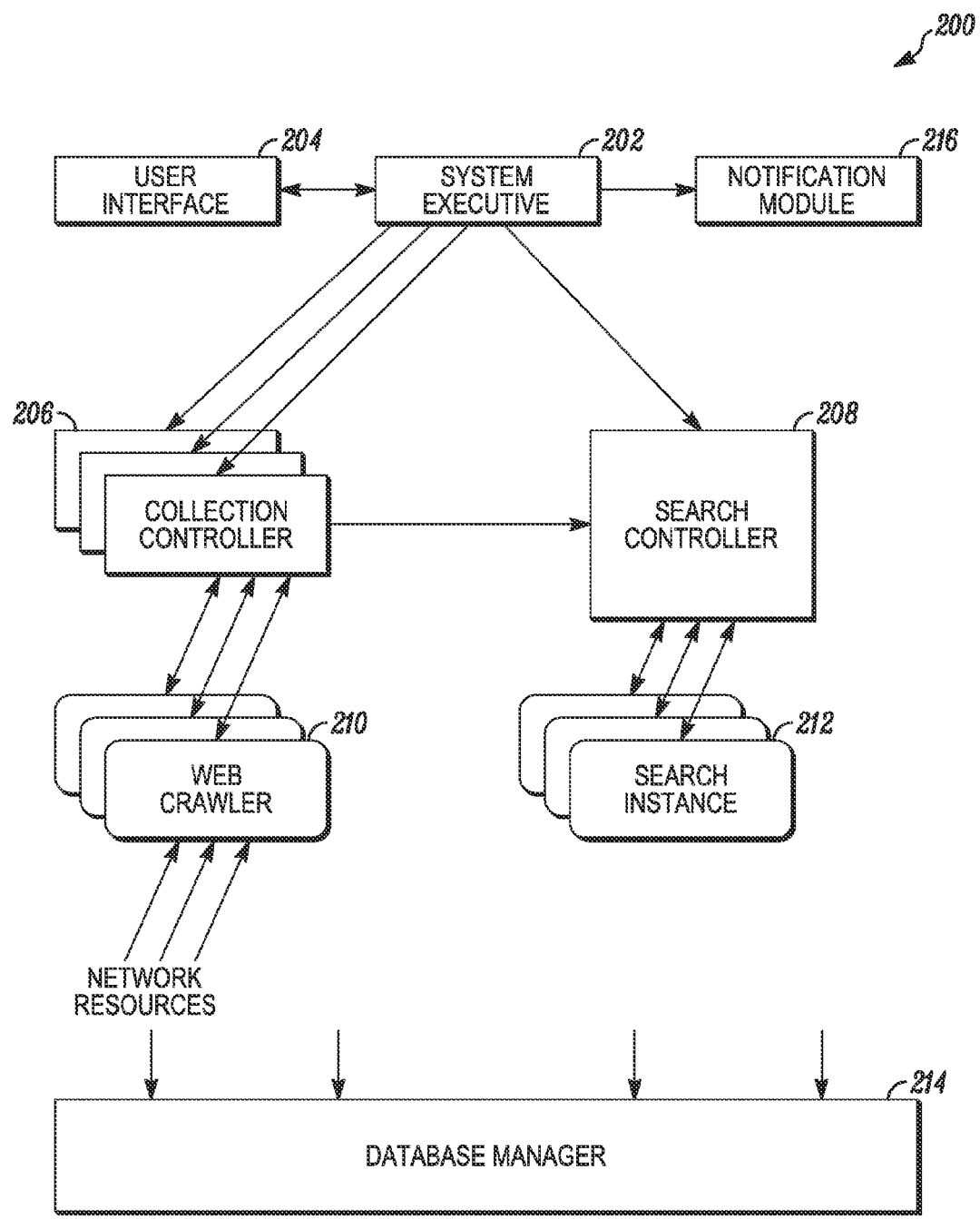
FIG. 23 is a block diagram illustrating a system for identifying parties in possession of potential transfer items.
Figure 24:
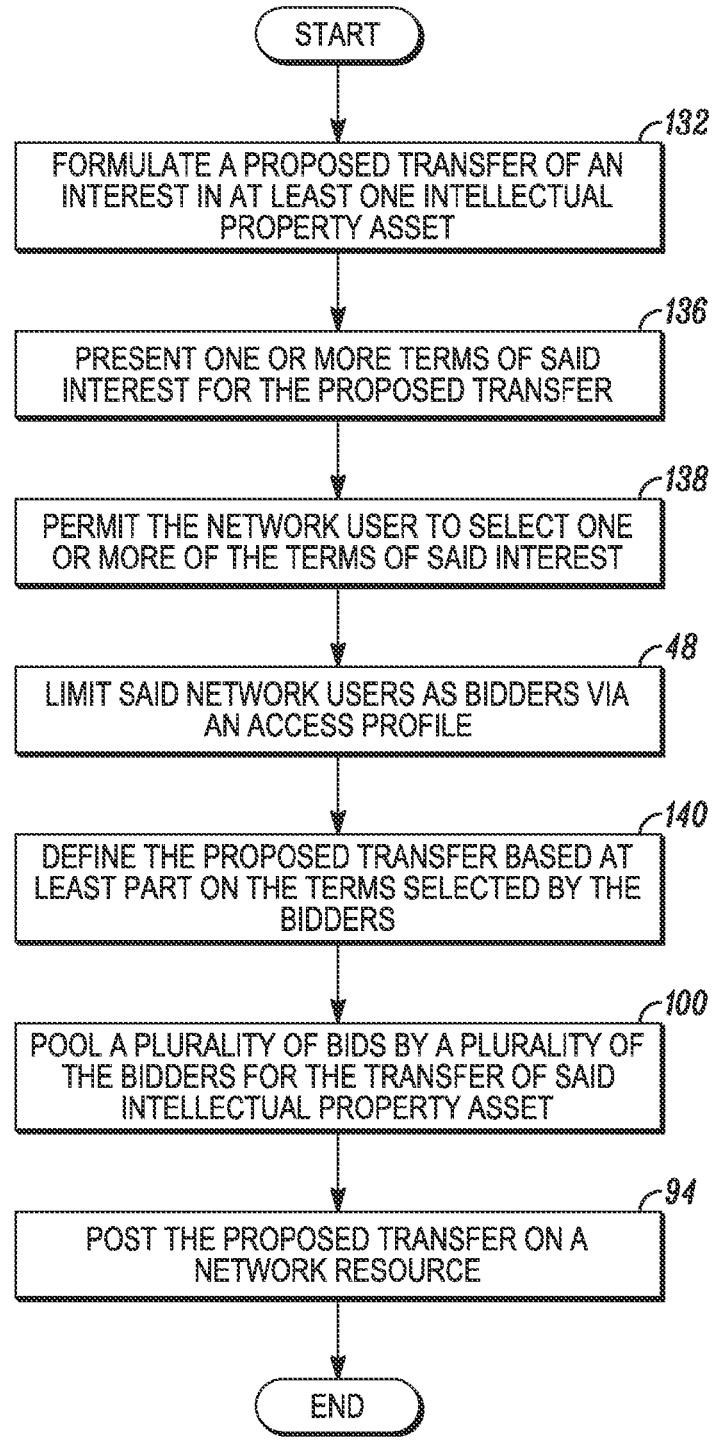
FIG. 24 is a flowchart of a method for facilitating transfer of an interest in at least one an intellectual property asset, in accordance with an embodiment.
Figure 25:
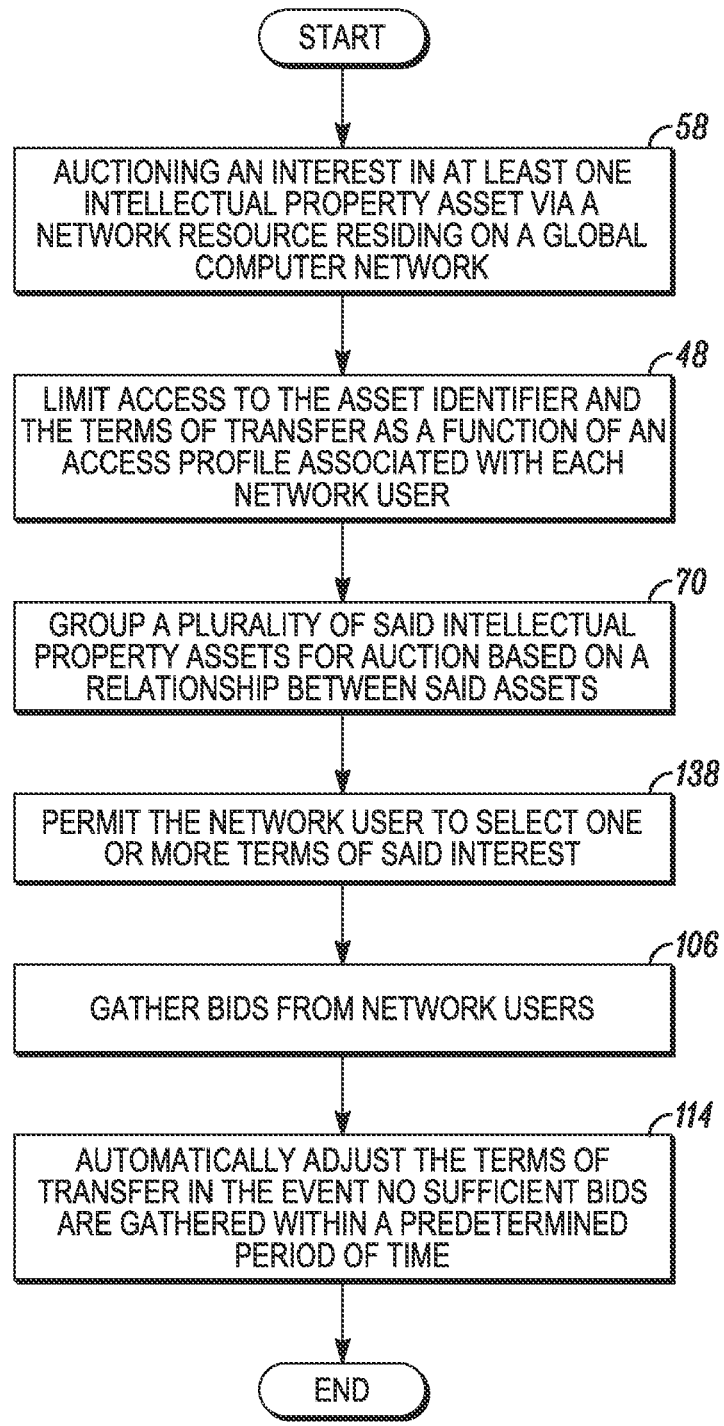
FIG. 25 is a flowchart of a method for facilitating transfer of an interest in at least one an intellectual property asset, in accordance with another embodiment.
Figure 26:
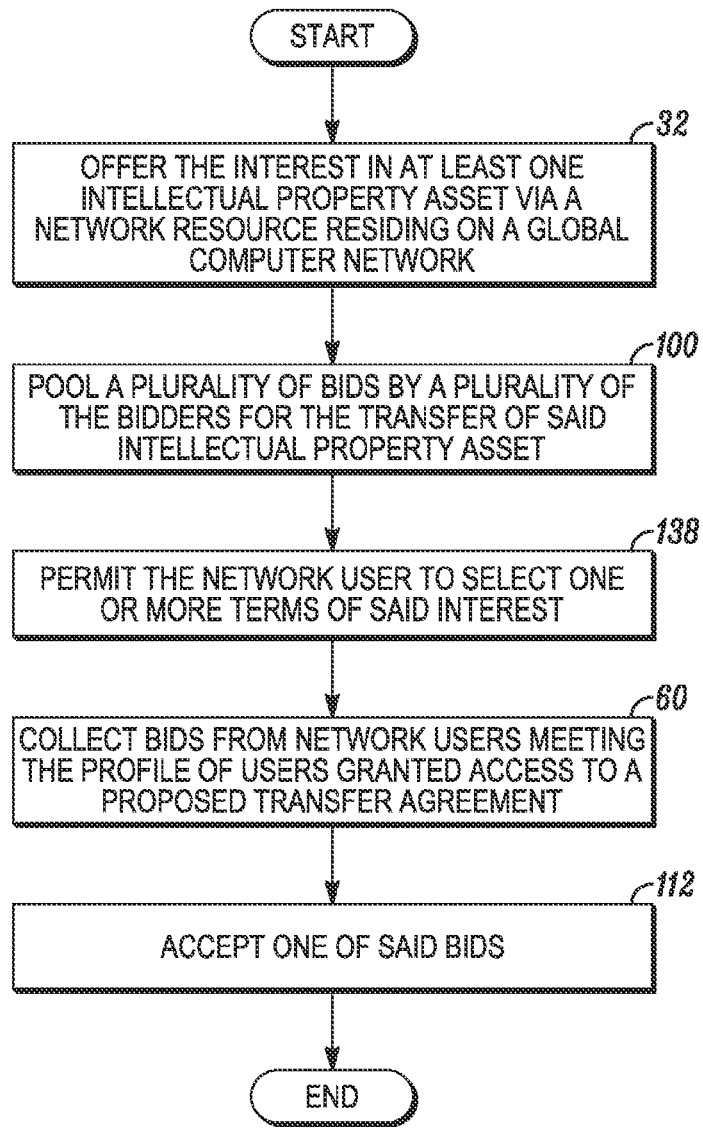
FIG. 26 is a flowchart of a method for auctioning an interest in at least one intellectual property asset, in accordance with an embodiment.

FIG. 23 is a block diagram illustrating a system 200 for identifying parties in possession of potential transfer items. To increase the number of available transfer items, the web site can be integrated with an automated search mechanism that actively seeks intellectual property rights that may be ripe for transfer. As shown in FIG. 23, the search mechanism may constitute a web crawler that monitors publicly accessible resources on the network that are likely to yield information concerning distressed assets. System 200 may include a system executive 202, a user interface 204, one or more collection controllers 206, and a search controller 208. Collection controller 206 spawns one or more web crawlers 210, whereas search controller 208 spawns one or more search instances 212. A database manager 214 is provided for storage and retrieval of information obtained via the searches. A notification module 216 transmits a message to the owner of a distressed asset, advising the owner of the services available via system the web-based infomediary provided by system 10.

System executive 202 is responsible for overall control and management of system 200. Upon initial execution of system 200, system executive 202 starts execution and instantiates database manager 214 for managing all accesses to a database. In one embodiment, database manager 214 has its own thread of execution. Preferably, database manager 214 has a client/server interface whereby other components of software system 200 initiate a remote procedure call in order to access the data of a database. In this manner, all accesses of the database are synchronized and inherently thread safe. Upon instantiating database manager 214, system executive 202 commands database manager 214 to retrieve configuration data from a database. Typical configuration data includes a maximum number of concurrent collection controllers 206 that may be instantiated concurrently, a maximum number of concurrent web crawlers 210 and a maximum number of concurrent search instances 212.

System executive 202 waits for a control message, which can be issued in two ways. First, user interface 204 presents a graphical interface by which an operator controls software system 200. After receiving input from the operator, user interface 204 communicates a control message to system executive 202. Second, software system 200 may include a timer thread that awakens at user-configurable times and sends control messages to system executive 202, thereby triggering automatic execution of software system 200. In either case, system executive 202 retrieves information concerning the network resources that are to be analyzed. More specifically, the database of software system 200 stores a plurality of resource identifiers, each identifier corresponding to a resource residing on the global computer network. In one embodiment, the database stores a plurality of domains for monitoring.

Each domain identifies a website of a company, government body or other organization, and is selected on the basis of content that is likely to identify parties in possession of distressed assets or in parties in precarious financial states. System executive 102 instantiates one or more collection controllers 206, each of which traverse a respective network resource and develop a list of links defined by the resource. For each link, a collection controller 206 instantiates a web crawler 210 that traverses the information designated by the link and retrieves its content. Following retrieval of the content, search controller 208 instantiates a search instance 212 in which the parameters of a search defined by the user are applied to the content. The search parameters may be as simple as a list of parties declaring bankruptcy. Other searches may be more sophisticated, targeting particular industries, technologies, and business sectors. Upon identification of a party in possession of distressed assets or a party who has recently declared bankruptcy, notification module 216 may automatically, or at user instruction, send a message to the party advising it of the services available via system 10. In this manner, system 200 can be exploited to pull potential ip sellers toward system 10.

The foregoing detailed description has been provided for a better understanding of the invention and is for exemplary purposes only. Modifications may be apparent to those skilled in the art without deviating from the spirit and scope of the claims.

The invention claimed is:

1. A method for facilitating transfer of an interest in at least one intellectual property asset via global computer network, the method comprising:
    formulating a proposed transfer, by a computer system, of an interest in at least one intellectual property asset based on input submitted by a network user;
    presenting, by the computer system, one or more terms of said interest for the proposed transfer;
    permitting the network user, by the computer system, to select one or more of the terms of said interest;
    limiting, by the computer system, said network users as bidders via an access profile;
    defining, by the computer system, proposed transfer based at least part on the terms selected by the bidders;
    pooling, by the computer system, a plurality of bids by a plurality of the bidders for the transfer of said intellectual property asset; and
    posting, by the computer system, the proposed transfer on a network resource residing on a global computer network.

2. A method for facilitating transfer of interests in at least one intellectual property asset via a global computer network, the method comprising:
    auctioning, by the computer system, an interest in at least one intellectual property asset via a network resource residing on a global computer network, wherein auctioning an interest includes listing, as part of an auction process, an asset identifier corresponding to the asset and terms of transfer of the interest in the intellectual property asset;
    limiting access, by the computer system, to the asset identifier and the terms of transfer as a function of an access profile associated with each network user;
    grouping, by the computer system, a plurality said intellectual property assets for auction based on a relationship between said assets;
    permitting, by the computer system, the network user to select one or more terms of said interest;
    gathering bids from network users, by the computer system; and
    automatically adjusting the terms of transfer, by the computer system, in the event no sufficient bids are gathered within a predetermined period of time.

3. The method for facilitating transfer of an interest in an intellectual property asset via the global computer network of claim 1, wherein limiting bidders via an access profile includes accessing, by the computer system, a database of access profiles, wherein each network user has an associated access profile.

4. A method for auctioning an interest in at least one intellectual property asset via a global computer network, the method comprising:
    offering, by the computer system, the interest in least one intellectual property asset via a network resource residing on a global computer network, wherein the interest in the at least one intellectual property asset is defined by a proposed transfer agreement and a profile of users granted access to the proposed transfer agreement;

pooling, by the computer system, a plurality of bids by a plurality of the bidders for the transfer of said intellectual property asset; and permitting, by the computer system, the network user to select one or more terms of said interest;

collecting, by the computer system, bids from network users meeting the profile of users granted access to the proposed transfer agreement; and accepting, by the computer system, one of said bids.

5. The method for auctioning an interest in an intellectual property asset via a global computer network of claim 4, wherein the proposed transfer agreement is a proposed licensing agreement.

6. The method for auctioning an interest in an intellectual property asset via a global computer network of claim 4, wherein the intellectual property asset is a patent.

7. The method of claim 1, wherein grouping comprises packaging the at least one intellectual property asset.

8. The method of claim 1, wherein grouping comprises pooling the at least one intellectual property asset.

9. The method of claim 8, wherein pooling comprises communicating, via a web-server, a pooling request to pool the at least one intellectual property asset to at least one prospective pooling seller.

10. The method of claim 9 further comprising presenting, via the web-server, proposed transfer terms to the at least one prospective pooling seller based on interest of the at least one prospective pooling seller in the pooling request.

11. The method of claim 10 further comprising performing, via the web-server, modifications on the proposed transfer terms by the at least one prospective pooling seller.

12. The method of claim 1, wherein the at least one intellectual property asset may be related based on technology area.

13. The method of claim 1, wherein the at least one intellectual property asset may be related based on at least one of a product line and a business field.

14. The method of claim 2, wherein grouping comprises packaging the at least one intellectual property asset.

15. The method of claim 2, wherein grouping comprises pooling the at least one intellectual property asset.

16. The method of claim 2, wherein the at least one intellectual property asset may be related based on at least one of technology area, a product line, and a business field.

17. The method of claim 4, wherein grouping comprises packaging the at least one intellectual property asset.

18. The method of claim 4, wherein grouping comprises pooling the at least one intellectual property asset.

19. The method of claim 4, wherein the at least one intellectual property asset may be related based on at least one of technology area, a product line, and a business field.

20. A system for facilitating transfer of interest in intellectual property assets via global computer network, the method comprising:

an asset control center for storage of information regarding at a plurality of intellectual property assets;

a web server for communicating a pooling request to pool a set of related said intellectual property assets to at least one prospective pooling seller, wherein said web server presents proposed transfer terms to the at least one prospective pooling seller based on interest of the at least one prospective pooling seller in the pooling request, said web server pools the set of related intellectual property assets in response to the at least one prospective pooling seller accepting the pooling request, and said web server pools a plurality of bids by a plurality of the bidders for the transfer of said intellectual property asset.

21. The system of claim 20, wherein said web server codifies the proposed transfer terms at the request of at least one prospective pooling seller.

22. The system of claim 20, wherein said web server relates a plurality of said intellectual property assets based on at least one of a technology area, a product line, and a business field.

* * * * *